US007453176B2

(12) United States Patent  
Davison

(10) Patent No.: US 7,453,176 B2  
(45) Date of Patent: Nov. 18, 2008

(54) HARMONIC DRIVE MOTOR

(75) Inventor: Ernie Davison, Moffat (CA)

(73) Assignee: E.D.M. Resources, Inc., Moffat, Ontario (CA)

( * ) Notice: Subject to any disclaimer, the term of this patent is extended or adjusted under 35 U.S.C. 154(b) by 527 days.

(21) Appl. No.: 10/526,776

(22) PCT Filed: Sep. 11, 2003

(86) PCT No.: PCT/CA03/01328

§ 371 (c)(1),
(2), (4) Date: Mar. 8, 2005

(87) PCT Pub. No.: WO2004/025815

PCT Pub. Date: Mar. 25, 2004

(65) Prior Publication Data

US 2005/0253675 A1 Nov. 17, 2005

(30) Foreign Application Priority Data

Sep. 11, 2002 (GB) ................................. 0221070.6

(51) Int. Cl.  
H02K 7/10 (2006.01)  
H02K 41/06 (2006.01)
(52) U.S. Cl. ...................... 310/75 R; 310/209; 310/216
(58) Field of Classification Search ............... 310/75 R, 310/80–86, 209, 216, 184–185, 190–191  
See application file for complete search history.

(56) References Cited

U.S. PATENT DOCUMENTS 3,331,974 A 7/1967 Proctor (Continued)

FOREIGN PATENT DOCUMENTS

GB 2 088 645 A 6/1982

(Continued)

OTHER PUBLICATIONS

Torrey, David A., Switched Reluctance Generators and Their Control, IEEE Transactions on Industrial Electronics, vol. 49, No. 1, Feb. 2002.

(Continued)

Primary Examiner—Tran Nguyen  
(74) Attorney, Agent, or Firm—Mark A. Litman & Associates, P.A.

(57) ABSTRACT

A core for a flexispline motor is enclosed within a distortable flexispline having the shape of an open tin can, such that under rest conditions the space between the flexispline and the core is constant. The core of the motor is shaped as in a hub and spoke configuration, with spokes having variable widths. Coils are fitted to the spokes and are connected in pairs such that pairs of coils on opposing spokes are in series bucking relationship. A second set of coils, which overlap the first coils, can be connected in a non-bucking manner to increase the magnetic flux produced by the coils on opposing spokes. The flexispline has a flexible ring gear incorporated in its surface near the open end which when magnetically attracted ceases to have a circular shape and forms a two-lobe (elliptical) or three-lobe shape. Under these conditions the corresponding points of the shape so formed contact a ring gear which is mounted on a rotating hub. The points of the flexible ring gear which correspond to the minor axes contact the surface of the core. As the magnetic force rotates the distorted shape rotates, but the flexispline itself does not rotate. Because the number of teeth on the ring gear and the flexible gear are different, the hub is forced to rotate at reduced speed. An alternative construction embodies a splined locking arrangement to rotatably fix an open cylinder, composite material flexispline to the electromagnetic core. Other concentric pairs of inner and outer electromagnetic winding arrangements achieve pull-in pull-out flexispline distortion of elliptical or threelobe shape.

29 Claims, 27 Drawing Sheets

U.S. PATENT DOCUMENTS

| | | | | |
|---|---|---|---|---|
| 4,227,092 A | * | 10/1980 | Campagnuolo et al. | 290/1 C |
| 4,363,987 A | * | 12/1982 | Vorotyntseva et al. | 310/216 |
| 4,883,999 A | * | 11/1989 | Hendershot | 310/254 |
| 5,043,618 A | * | 8/1991 | Stephenson | 310/168 |
| 6,288,471 B1 | * | 9/2001 | Kometani et al. | 310/254 |
| 6,566,777 B2 | * | 5/2003 | AbuAkeel | 310/209 |
| 2005/0253675 A1 | * | 11/2005 | Davison | 335/220 |

FOREIGN PATENT DOCUMENTS

| | | |
|---|---|---|
| GB | 2 377 733 A | 1/2003 |
| JP | 61 231863 A | 10/1986 |
| JP | 02 065657 A | 3/1990 |
| JP | 02275146 A * | 11/1990 |
| JP | 4 12658 | 1/1992 |
| JP | 2002 325418 | 11/2002 |
| SU | 448559 | 12/1974 |

OTHER PUBLICATIONS

Nürnberg, Thomas Stocker, Hochauflösender Schrittantrieb, F&M Feinwerktechnik Mikrotechnik Messtechnik, Carl Hanser, GMBH, München, Germany, 1995.

* cited by examiner

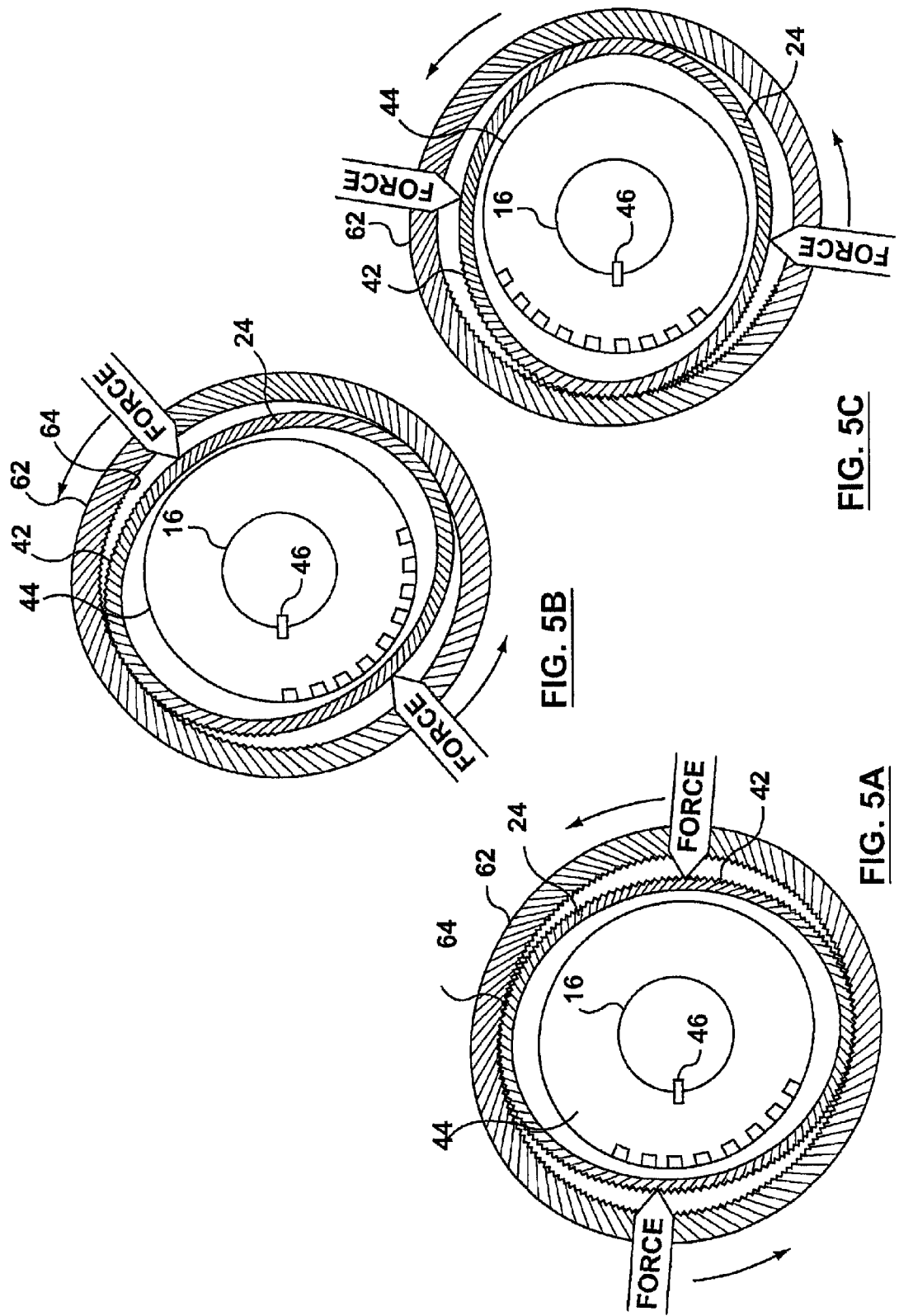

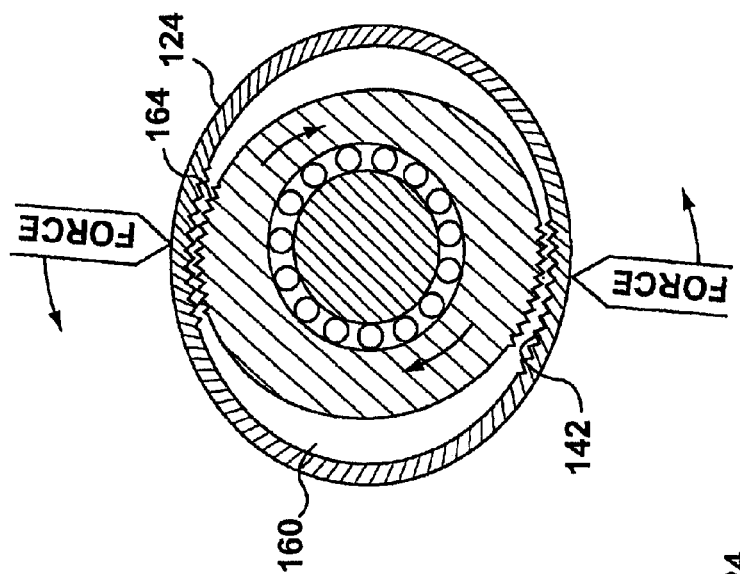
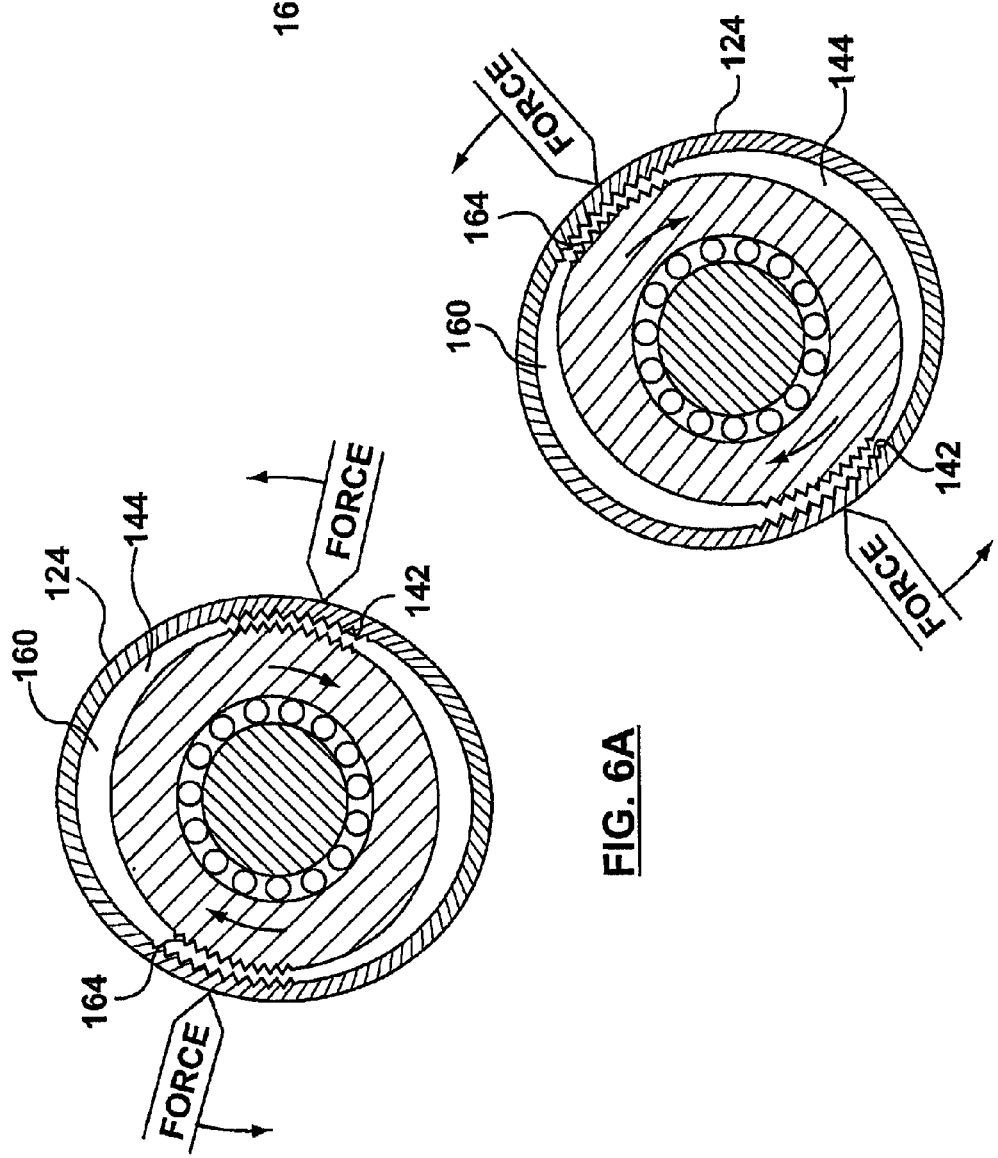
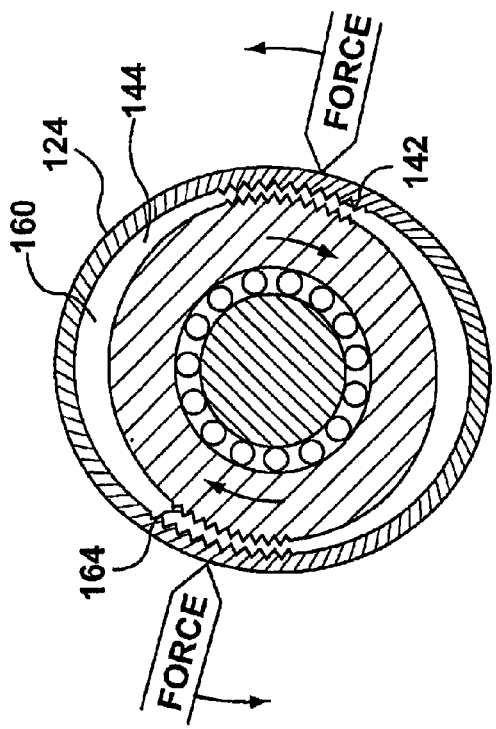
FIG. 6A
FIG. 6B
FIG. 6C

HARMONIC DRIVE MOTOR

This invention relates to a high torque low speed motor, which as part of its construction contains a electromagnetic permeable cup, which is elastically distorted by the influence of a electromagnetic field. This cup has the classical shape of an open-ended tin can in which a cylinder and generally an end disc are integrally connected. The open end of the cylinder incorporates a band gear having radially extending teeth, which is also capable of undergoing elastic deformation as the cylinder of the cup is deformed. When the magnetically permeable cup is exposed to a rotating magnetic field, an elastic distortion is produced, which manifests itself as a wave phenomena progressing around the open end of the cup. That is the open end of the can assumes the shape of an ellipse (two-lobed) or tricom (three-lobed), or (four-lobed) shape, which continues to rotate about the longitudinal axis of the cup.

The open end of the cup on which the band gear is located is made to contact a gear in close proximity to the cup (which gear does not undergo any significant distortion) and which is contacted by said gear for example at two opposing points at the ends of the major axis of the elliptical shape assumed by the cup and band gear combination, or the protruding nodes of the other shapes.

The band gear and the contacting gear have teeth, which mesh; both sets of teeth have the same pitch but differ in number. As the distorted shape of the end of the cup sweeps around the central axis of the cup, the radially extending teeth of the band gear progressively engage different teeth of the contacting gear; and because of the differing number of teeth on the two gears, relative rotation of the two gears occurs. This gearing phenomenon is well known and is usually referred to as strain wave gearing.

An alternative form of construction embodies a composite materials flexispline of open cylinder form, open both ends, and rotatively fixed by means of integral male longitudinal splines. These splines mating into similar female splines formed in the circumferential surface of the internal electromagnetic core, this allows band gear teeth radial movement but prevents flexispline rotation, while permitting signifigantly greater torque transfer with a low distributed pressure. This mating spline arrangement may also be applied beneficially to the one closed end cup construction of paragraph 1 above.

BACKGROUND OF THE INVENTION

The principles of strain wave gearing or flexispline drives are well known and are discussed in U.S. Pat. No. 2,906,143 (Sep. 29, 1959) and U.S. Pat. No. 2,931,248 (Apr. 15, 1960) issued to Musser. There the underlying principles involving the continuous oscillatory contact of a flexible spline (flexispline) with a ring gear to produce a rotational output from the ring gear are discussed in some detail. A torque is produced in the ring gear by the continuous elastic deformation of the flexible spline's gear tooth ring by a cam device called a strain inducer to cause the teeth on the flexispline to be driven into sequential engagement with the teeth of the ring gear.

Because the fixed flexispline and the ring gear have a different number of teeth, the ring gear is forced to rotate a distance equal to the small tooth difference (generally two teeth for elliptical distortion) between the flexispline and the ring gear for one revolution of the strain inducer.

Providing that the number of teeth on the flexispline and ring gear is large and the tooth differential is small between the flexispline and the ring gear (as it usually is), a tremendous gear reduction ratio can be realized between the rotation of the strain inducer and the ring gear. The output torque is developed from the continuous sequential meshing of the teeth of the flexispline with the ring gear and is proportional to the inverse of the gear ratio. This torque is generated by the rotating strain inducer, which is constantly distorting the flexispline to engage the ring gear in a sequential manner.

Since 1959, a number of electromagnetically distorted strain wave gearing units have been produced in which a permeable magnetic cup was distorted by an electromagnetic force to produce rotation of the flexispline cup. Various materials, and configurations of the materials, forming the magnetic cup were attempted with varying degrees of success. Generally speaking, these devices have been limited to relatively low output torque and power driving motors and stepping motors.

The size and shape of the unit may change, but the continuous sequential multiload distortion of a flexible cylinder is always present to produce output rotational motion at modified speeds and torques. It is a prime objective of the present invention to extend the application of this electromagnetically driven flexispline technology into applications requiring significantly greater and efficient output torque and power.

SUMMARY OF THE INVENTION

This invention relates to a low speed high torque motor, which contains as part of its construction a magnetically permeable sleeve (flexispline). Preferably, the sleeve in its non-deformed shape is cylindrical, but when under the influence of an electromagnetic field becomes distorted into an multi-lobed shape. Both the flexispline and the stator core of the motor remain rotationally stationary during operation of the unit.

The sleeve itself is preferably anchored to a cylindrical electromagnetic core by means of a bolted flange arrangement or interlocking splines, which facilitate torque transmission and prevent rotation of the sleeve, but allow it to undergo a cross-sectional shape distortion from a circle to the multilobed shape.

The electromagnetic core preferably is provided with a series of axially extending grooves (slots) on its surface which lock into complementary splines on the inside of the surface of the flexispline sleeve. The grooves of this magnetic core may also house the stator windings which produce the electromagnetic field in the motor.

One part of the sleeve is provided with gear teeth which may be integrally formed in the sleeve surface or it may be a band fixed to the surface of the sleeve by some acceptable means. The band gear is also distorted by flexing motion of the sleeve to undergo the same distortion as the sleeve, and is preferably constructed from low elastic-modulus materials, such as polymer composite or hard coated magnesium or aluminium alloy.

The band gear of the sleeve meshes with another gear which, at rest, preferably is spaced very close to but not necessarily engaging the band gear. The band gear and the enclosed gear have the same tooth pitch, but the tooth number are deliberately made to be different for the two gears.

Upon excitation of the electromagnetic core, the sleeve undergoes wave distortion as does the band gear and the distortion of the band gear causes the band gear teeth to engage the teeth of the other gear at corresponding points. As the distorted sleeve shape sweeps about the other gear, the tooth engagement progresses around the said gear and because of the difference in the number of teeth on the two gears, the said output gear rotates in greatly reduced motion, with respect to the rotating excitation magnetic field.

The flexispline and the stator core comprise an electromagnetic system for which a rotating magnetic field is generally produced by a set of preferably inverted stator windings placed inside the flexispline which in turn produces a magnetic flux to distort the flexispline. In this instance the stator windings are carried by the central core or that part of a conventional electric motor which is usually occupied by the rotor. These stator windings may be formed using superconducting cooled wire such as provided by American Superconducting Corporation.

Preferably, the stator core comprises a body of laminated magnetic material or its equivalent to enhance the concentration of the magnetic field produced by a set of windings carried by the stator core.

These stator core windings are made to produce and concentrate a rotating magnetic flux which preferably passes from the core, across an airgap, then into the flexispline, splits, and returns to the core. This magnetic flux preferably is produced by passing a programmed commutated modulated current through the core windings. The resultant magnetic flux produces a rotating concentrated radially directed force of variable speed.

The stator core itself is preferably mounted on a sturdy stationary central post which may be hollow and comprised of an electrically resistive (ohmic) magnetic material which serves to provide a rigid mounting means for the ring gear hub and any external load carried by the hub at the end of the post. The hub is mounted on the post so that the ring gear provided in the hub enjoys a close concentric relationship with the stator core and the flexispline. Preferably, a set of thrust bearings assures that the coaxial relationship of the core and the ring gear is maintained during rotation of the hub.

The hub may be connected to an output shaft or a screw actuator to produce rotational or linear motion. It may also be mounted within a wheel of a vehicle to provide power to drive the wheel. When the device of this invention is mounted within a wheel, the shaft may also support the cantilevered vehicle load on the extended shaft and bearings. Thus reducing an equivalent parts count.

Some differences over the prior art may be noted.

1) The stator core is surrounded by the distorting flexispline, and
2) The flexispline itself provides a return path for the magnetic flux. This improves the applicability of this device to more diverse applications and allows the flexispline diameter to be increased substantially over the prior art motors. These features make it possible to increase the output torque, power and efficiency of the device over the prior art models.
3) The flexispline itself does not rotate during operation of the motor.
4) The stator windings are designed to maximize the radially directed force vector, which is responsible for causing engagement of the band gear and the enclosed gear, and hence to maximise torque output.
5) The use of a composite or wire/tape wound under tension with locked in radiat pressure over metal flexispline. Flexispline also reduces flexispline distortion stiffness, which increases torque output and efficiency. (Ref. Advance Mechanics of Materials seely. Smith Wiley Page 608)
6) The use of a splined interlocking flexispline arrangement dispenses with the need for a closed-ended cup assembly to transfer output torque, and/or reduces the torsional stiffness requirements of same.
7) The large diameter flexispline, allows flexispline distortion with a reduced radially force, and permits more redially multi-lobed distortion.
8) The multi-lobed flexispline distortion capability, allows for potential effective gear ratio change electromagnetically, on line during operation.
9) Rectangular profile cross section electromagnetic core teeth, increase the radial force in a major way over dumbbell shaped teeth employed in previous flexspline motor excitation systems.
10) Variable with electromagnetic core teeth reduce the magnetic flux saturation levels in the teeth thus increasing torque and power output.
11) Previous flexispline motor technology employed relatively thin walled flexisplines of generally poor magnetic permanances the present invention calls for relatively thick walled flexisplines(in some cased ranging from 0.25 to 0.5 inches and greater as required)of high magnetic permanence such as Carpenter Hypeco 15.
12) The relatively thick walled flexispline of this invention provides a major return path for the magnetic flux, thus maximizing torque/power output.
13) The preferred embodiment of this invention in terms of flexispline and output ring gear orientation (interal teeth of flexispline contacting output ring gear at point of radial force application)as shown in FIG. 7 confersan approximate 10% advantage over the alternative(external teeth on flexispline contacting ring at 90° phase lag from point of radial force application) In terms of flexispline diameterial deflection per unit radial force.
14) The control circuitry and commutation strategy such as FIGS. 31 and 32 is ver important to the proper functioning of flexispline motors specified in the paten application. However, there is no present evidence that such have been applied before in the strain motor context. Otherwise, the negative torque due to declining inductance cancels out most of the positive torque due to increasing inductance.

PRIOR ART

US Pat. No. 2,906,143 Musser Sep. 29 1959:
This patent describes in detail the principles of strain wave gearing using a mechanical strain inducer to distort the flexispline. At FIGS. 54 and 55 Musser briefly describes a method of operation of a flexispline device driven by a polyphase electrical input and a series of electrical solenoids.

U.S. Pat. No. 3,169,201 Spring et al Feb. 9, 1965:
This patent describes a flexispline motor having an external stator (which is stationary) comprising a number of circumferentially distributed salient poles (axially aligned solenoid pole pairs) having an adjacent ring gear also mounted in the stator adjacent the poles.

A flexispline rotor is attached to a shaft and is mounted for rotation within the stator and is provided with external gear teeth on the exterior surface thereof to mesh with a ring gear encircling the flexispline. The flexispline rotor is provided with a radial series of magnetically permeable axially aligned laminations mounted under its surface and allowed to pivot about one end (acting as a lever). These laminations are fastened to a rotor fulcrum ring and encouraged to pivot when subjected to a radial magnetic, force. A substantial mechanical advantage results. Upon actuation by a sequentially pulsed rotating magnetic field, the laminations pivot outwardly to cause the flexispline to distort and contact the surrounding ring gear. This causes rotation of the flexispline rotor and its attached shaft (in a direction opposite the direction of the rotating magnetic field). The rotor thus moves in accordance with the tooth differential existing between the ring gear and the flexispline gear giving rise to substantially reduced rotational motion at the output.

U.S. Pat. No. 3,496,395 (Newell Feb. 17 1970):

In one described embodiment of this technology, a stator is supplied with a set of windings to produce a rotating magnetic field. The stator comprises a series of stacked laminations which not only serve to provide a mounting system for the windings but also serve to provide a surface for attaching a stationary co-axial ring gear in the air gap between the stator and the flexispline rotor. The stationary ring gear has internally extending teeth which are engaged by the flexispline rotor externally extending teeth as it is distorted by a rotating magnetic field.

The flexispline rotor in this instance is a thin (which limits the magnetic flux through it) flexible magnetically permeable hollow cylinder having ends closed by membranes which support and allow deflection of the cylinder but limits the magnetic flux flow through it.

A shaft is made to pass through the central axis thereof. The closed ends of the flexispline cylinder are fastened to the shaft so that any rotation of the flexispline is transferred to the central shaft.

The rotating flexispline is provided with a gear which is mounted or formed in the surface thereof to contact the internally extending teeth of the stationary ring gear.

The magnetic flux produced by the stator windings passes into and returns from the hollow flexispline tube to produce a magnetic attraction force. Thus the circular shape of the cylindrical flexispline tube is distorted outwardly to force the teeth of the flexispline into engagement with the teeth of the stationary ring gear. The flexispline rotor thus rotates according to the tooth differential of the two sets of meshing gears, but in the opposite direction to the rotating magnetic field.

The major focus of this patent is to produce a biased coiled magnetically permeable flat strip within the flexispline rotor to enhance the magnetic attraction between the flexispline and the stator and to reduce edge effect discontinuities which effect the position controlaccuracy in a servomotor positioning application.

U.S. Pat. No. 3,169,202 Proctor et al Feb. 9, 1965:

This patent describes a flexispline motor having a fixed external stator in which conventional three phase induction windings and a stationary ring gear are mounted. A flexispline having pockets of powdered iron arranged beneath its surface, is influenced by a rotating magnetic field to distort under the attractive force of that field. This causes engagement of the flexispline gear with the stationary ring gear to produce motion in accordance with the tooth differential of the flexispline gear and the ring gear.

Various rotor constructions are shown in this patent, all designed to enhance the magnetic force attraction produced in the rotor by the magnetic field.

U.S. Pat. No. 3,609,423 Spring Sep. 28,1971:

This patent proposes the use of a tapered coil of flat flexible magnetic material beneath the flexispline to enhance elasticity and magnetic force attraction of the flexispline. The magnetic material is strategically slotted axially to decrease eddy current circulation.

U.S. Pat. No. 5,691,584 Nov. 25, 1997:

This patent is an excellent example of the state-of-the-art electrically driven vehicle in which a drive motor is located within the wheel and is connected through a double reduction gear transmission to produce a high driving torque.

U.S. Pat. No. 5,600,191 Feb. 4, 1997:

This relatively recent patent describes a driving assembly for a wheel In which low torque requirements are produced by an inside-out motor where the stator carries permanent magnets.

U.S. Pat. No. 4,389,586 Jun. 21, 1983:

This patent describes a driving arrangement for the wheel of a very large off-the-road vehicle. A DC motor drives the wheel through a double reduction gear train.

LIST OF THE DRAWINGS

FIGS. 5A, 5B, 5C show the distortion of the flexispline of FIG. 1 as the magnetic field rotates.

FIGS. 6A, 6B, 6C show the distortion of the flexispline of FIG. 2 as the magnetic field rotates.

FIGS. 31A, 31B, 31C, 31D describe, in block diagram form, control circuitry adaptable for control of switched-reluctance versions of flexispline motors.

Figure 32:
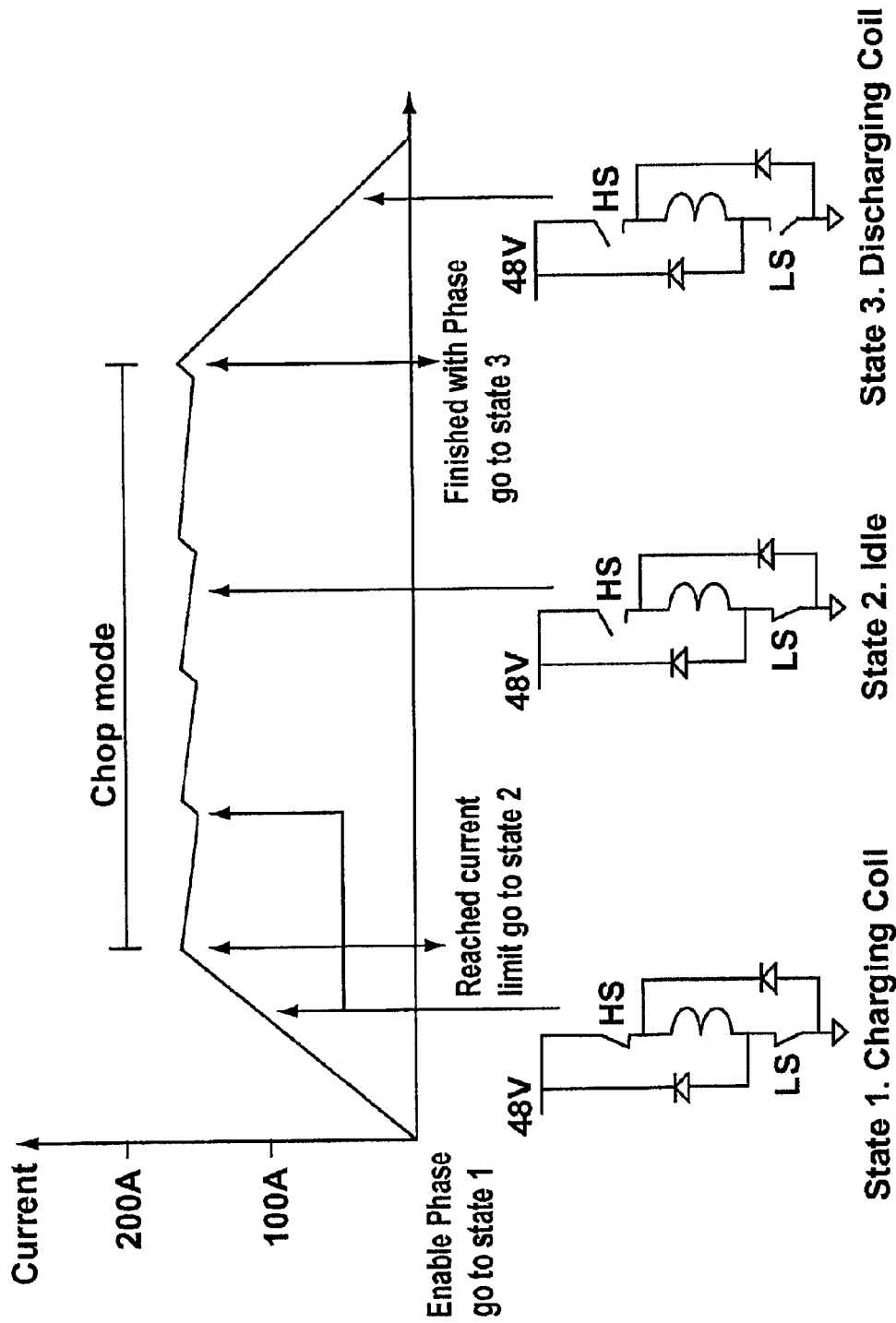

FIG. 32 describes the commutation strategy for the flexispline motors.

THE PREFERRED EMBODIMENTS

Figure 1:
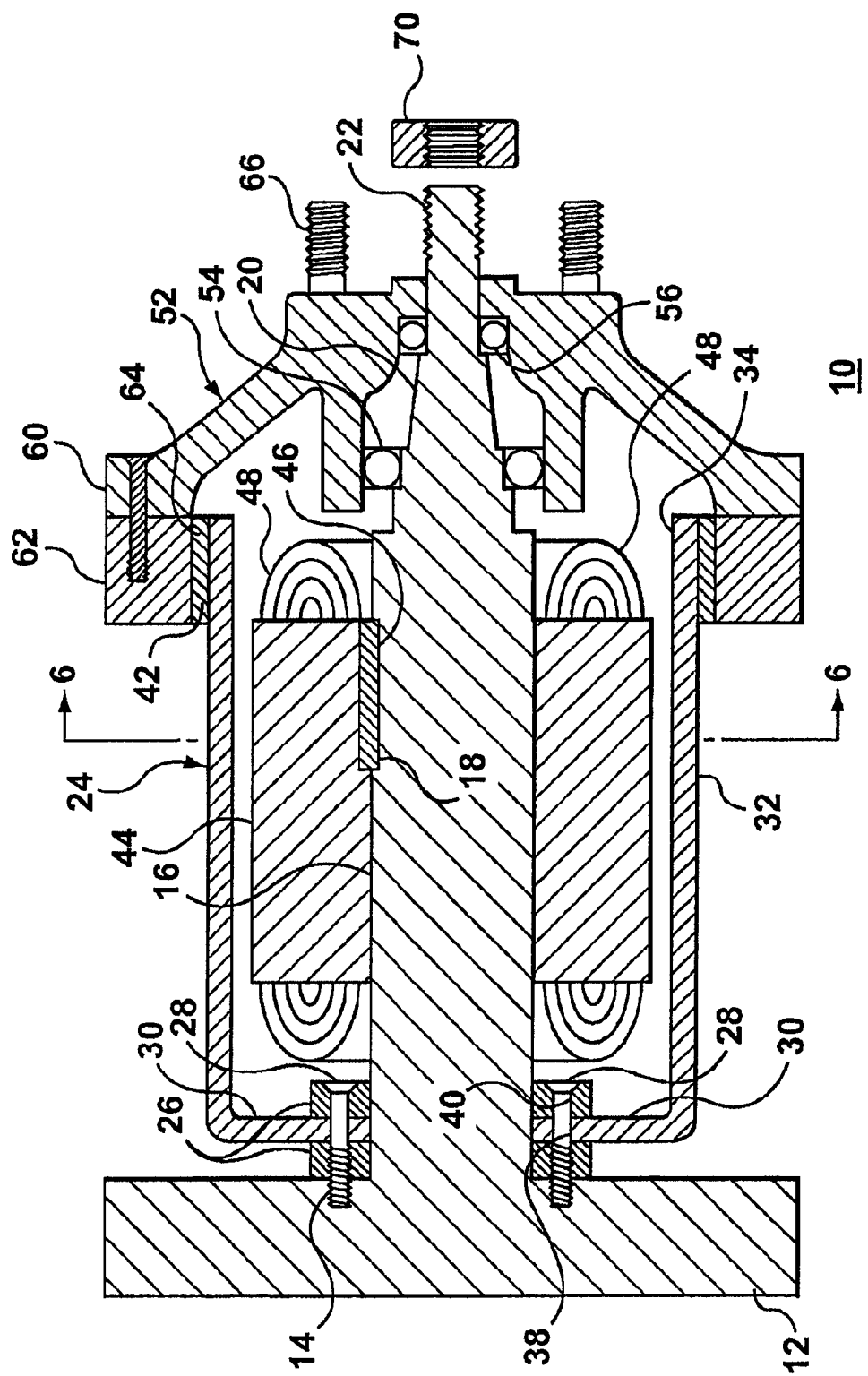
FIG. 1 is a cross sectional view of a flexispline motor.
Figure 3:
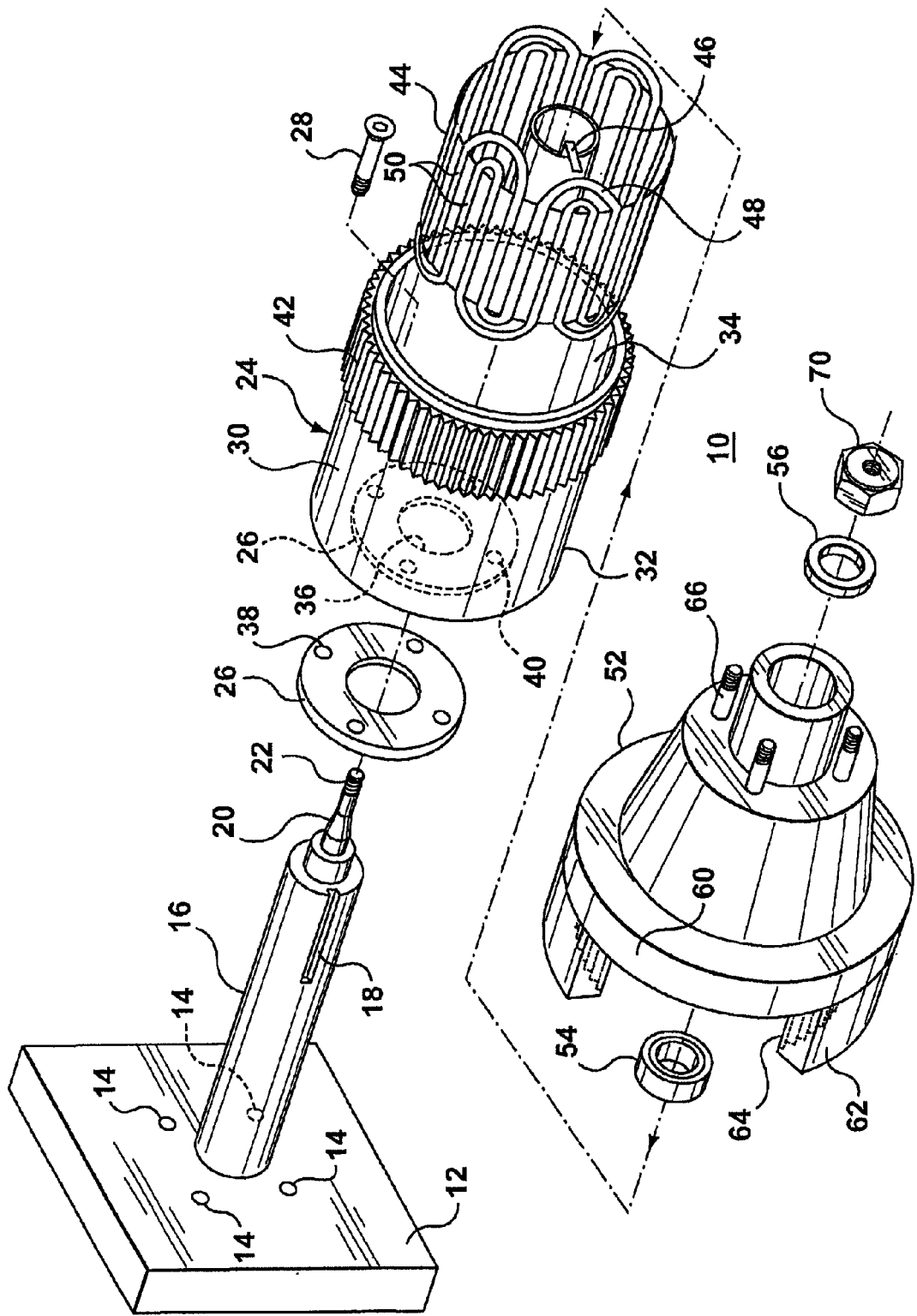
FIG. 3 is an exploded perspective of view of the device of FIG. 1.
Figure 4:
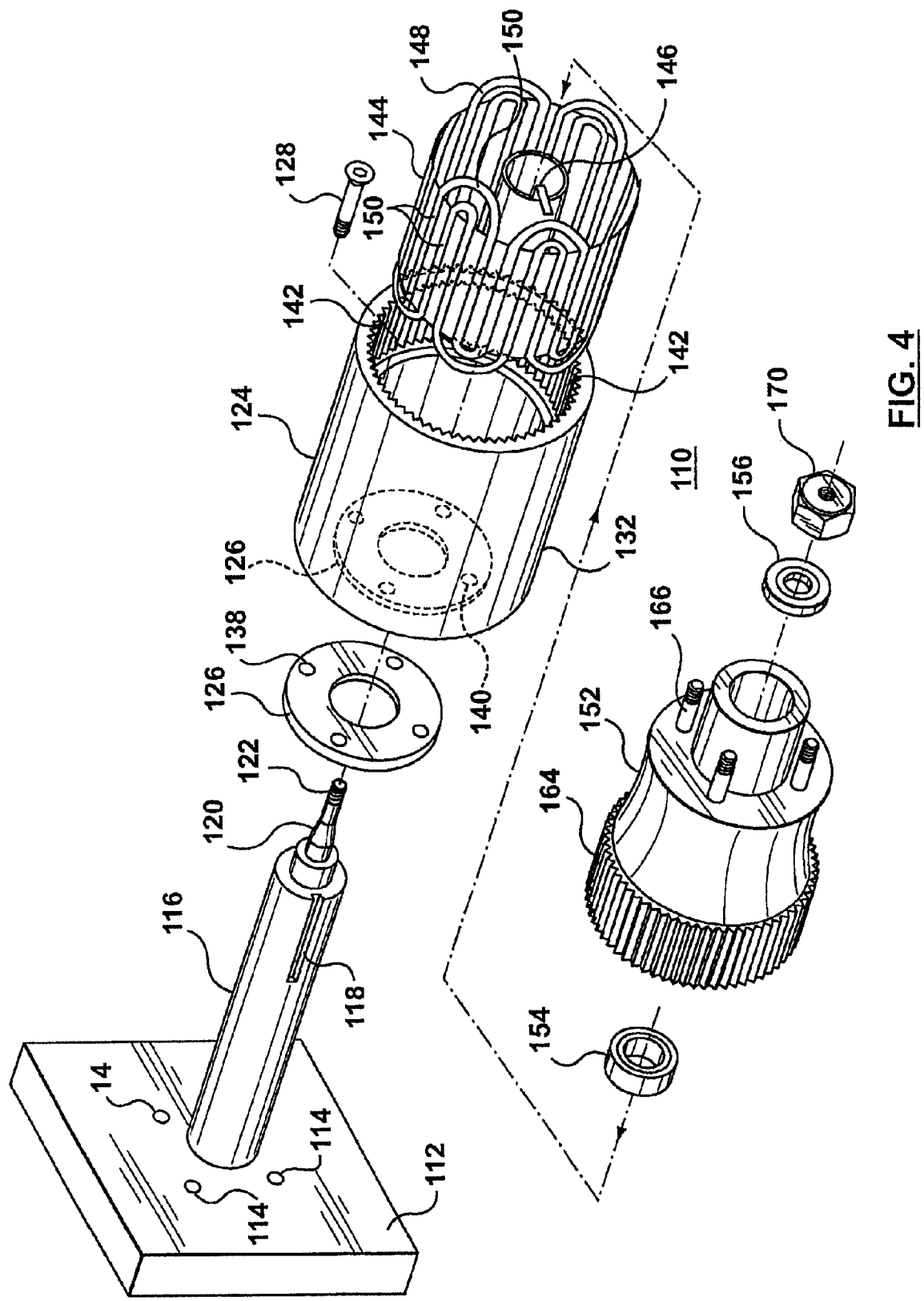
FIG. 4 is an exploded perspective view of the device of FIG. 2.

Referring now to FIGS. 1 and 3 in which wheel motor 10 is shown as a cross section FIG. 1 and as an exploded view in FIG. 3. The motor 10 is mounted on base plate 12, which in this illustration is provided with four threaded holes 14. The number of threaded holes depends on the application; there may be more or less holes 14 depending on the required output. A sturdy post 16 (which is preferably hollow, magnetic and of a high ohmic resistance) is mounted on base plate 12 so as to project orthogonally therefrom.

Post 16 is provided with keyway 18 and wheel bearing mounting segment 20. Post 16 terminates in a threaded end 22.

A somewhat cup-shaped flexible sleeve 24 (flexispline) is mounted on base plate 12 between a pair of spacers 26 by means of screws 28 so that it may not rotate. Sleeve 24 has a closed end 30 (which may be of somewhat heavier construction than the cylindrical upstanding portion 32) which is integrally attached to end 30.

Sleeve 24 has an open end 34 remote from end 30. The end 30 of flexispline 24 has a locating hole 36 provided therein to guide the flexispline along post 16 during installation, and the opening 36 serves to centre and locate the flexispline 24 on base 12 so that the holes 38 and 40 in the spacers 26 and end 30 of flexispline 24 may be easily aligned with threaded holes 14 of base plate 12 for ease of assembly and to maintain gearing tolerances.

The cylindrical upstanding portion 32 of flexispline 24 is provided with an external toothed gear 42 at or near the end 34 of flexispline 24. The flexispline 24 (in this instance) is composed of a highly permeable magnetic material having a high magnetic saturation level, as well as exhibiting a high resistance to eddy current circulation.

A suitable material for flexispline 24 for this application would be iron or iron alloys including steel silicon, nickel and/or cobalt alloys(such as Carpenter HyperCo 15). The cylindrical shell 32 is purposely made to be readially distorted so that its usual shape (that is to say, its undeformed and undistorted shape—which is a cylinder) may be distorted to take on a multi-lobed shape(when compelled by the magnetic force to change from its normal shape).

The deflection of the wall 32 of the flexispline 24 may be determined by the following equation:

$$P = K \cdot \Delta D \cdot L \cdot t3 \cdot E / r3$$

where
K=a constant
ΔD=diametrical deflection of cup (approximately twice the gear tooth height)
P=radial distorting force
L=axial length of the cup
t=wall thickness
E=flexural modulus (or composite flexural modulus)
r=radius of sleeve Thus the ratio $(t/r)^3$ One of the characteristics which should be determined with respect to the flexispline 24 before degree of deflection force is finally determined, is the amount of torsional twisting (shear stiffness) the flexispline 24 must withstand during operation (a function of the output load torque). The spline (or band) gear 42 mounted or formed on the outer surface of the sleeve will have a significant influence on the sleeve stiffness, which should therefore be minimised. Equation (1) above will also apply to the presence of spline gear 42 on flexispline 24 as well. In addition, it may be found that it is necessary to coat spline gear 42 with a hard coating to improve its wear characteristics, and to incorporate the interlocking splines of FIG. 28. This will reduce torque transmission shear requirements of the flexispline.

The flexispline 24 is mounted on base plate 12 by sliding it along post 16 until holes 38 and 40 line up with threaded holes 14. Countersunk screws 28 are threaded through holes 38 and 40 into the threaded holes 14 to hold the flexispline 24 finely between spacers 26 against base 12.

Next a magnetic core 44 is slid into place on post 16 and is rigidly mounted and located on post 16 in its home position and held in this location (in this instance) by means of key 46 in keyway 18. A corresponding keyway (not shown) is formed in core 44 to complement the keyway 18 formed in post 16.

Core 44 is supplied with a winding 48 which is wound in core slots 50 formed in the surface of core 44 in such a manner as to provide the rotating magnetic field when energized. This field ultimately causes the flexure of the wall 32 of flexispline 24.

A switched reluctance motor type field winding (for example four phase two rotor pole, or six and three phase with three rotor poles) along with appropriate control circuitry and communtation, such as depicted in FIGS. 31 and 32, may be used to provide the necessary deflection of the sleeve 32 of flexispline 24. The field winding may also be comprised of cooled superconducting wire as manufacture by American Superconductor Corporation USA.

Next a hub 52 (on which a vehicle wheel may be mounted) is rotatably journalled on post 16 by means of thrust bearings 54, 56 which are mounted on bearing segment 20 of post 16. In this instance, hub 52 is a robust casting having a similar shape to a truck or automobile wheel hub and brake drum assembly.

Hub 52 is provided with a pair of bearing recesses to receive a pair of thrust bearings 54 and 56 therein to assure that hub 52 is firmly locked into position and rotates concentrically with the axis of post 16.

Cylindrical shell 60 of hub 52 is provided with a cantilevered shell portion 62 which is provided with an internal spline gear 64. Gear 64 is made to have teeth which mesh with the teeth of spline gear 42 of flexispline 24 but the teeth comprising gear 64 are intentionally made to be different in number than the teeth in spline gear 42, but having the same pitch.

Hub 52 may be provided with a series of studs such as 66 for mounting a wheel rim thereon.

Referring now to FIGS. 5A, 5B, 5C, and FIGS. 6A, 6B, 6C, motor 10 is represented in cross section as taken along the axis of post 16, showing the distortion of flexispline 24 as the magnetic flux rotates about the axis of motor 10. Note that core 44 and flexispline 24 are rotationally stationary, but gear 64 is forced to rotate in the same direction as the rotating magnetic field.

The magnetic material comprising flexispline 24 is attracted to core 44 at the points where the magnetic flux emanating from core 44 is greatest. At a point lagging by 90° mechanical the interior surface of flexispline 24 is usually designed to be in close proximity to the exterior surface of core 44.

The rotating elliptical shape of flexispline 24 may in time produce wear on the surface of core 44 even though flexispline 28 and core 44 have no rotational motion (both are stationary). Flexispline teeth 42 oscillates about their own axis with a very small amplitude.

Because of this it may be necessary to provide the contacting surfaces of flexispline 24 and core 44 with a lubrication, which may be in the form of a solid lubricant incorporated in the surface of core 44. Core 44 may be fabricated from electrical iron laminations stacked to the desired length, or core 44 may be a composite, having finely divided particles of a magnetic material encapsulated in a polymeric substance. The latter composite provides a material having good magnetic permeability characteristics, while providing excellent resistance to the flow of three dimensional eddy currents. The composite core just described also provides a surface in which it is quite possible to incorporate a solid lubricant to reduce frictional losses (which leads to less production of heat in the core), and also to help dampen any vibrations due to system resonances.

Figure 2:
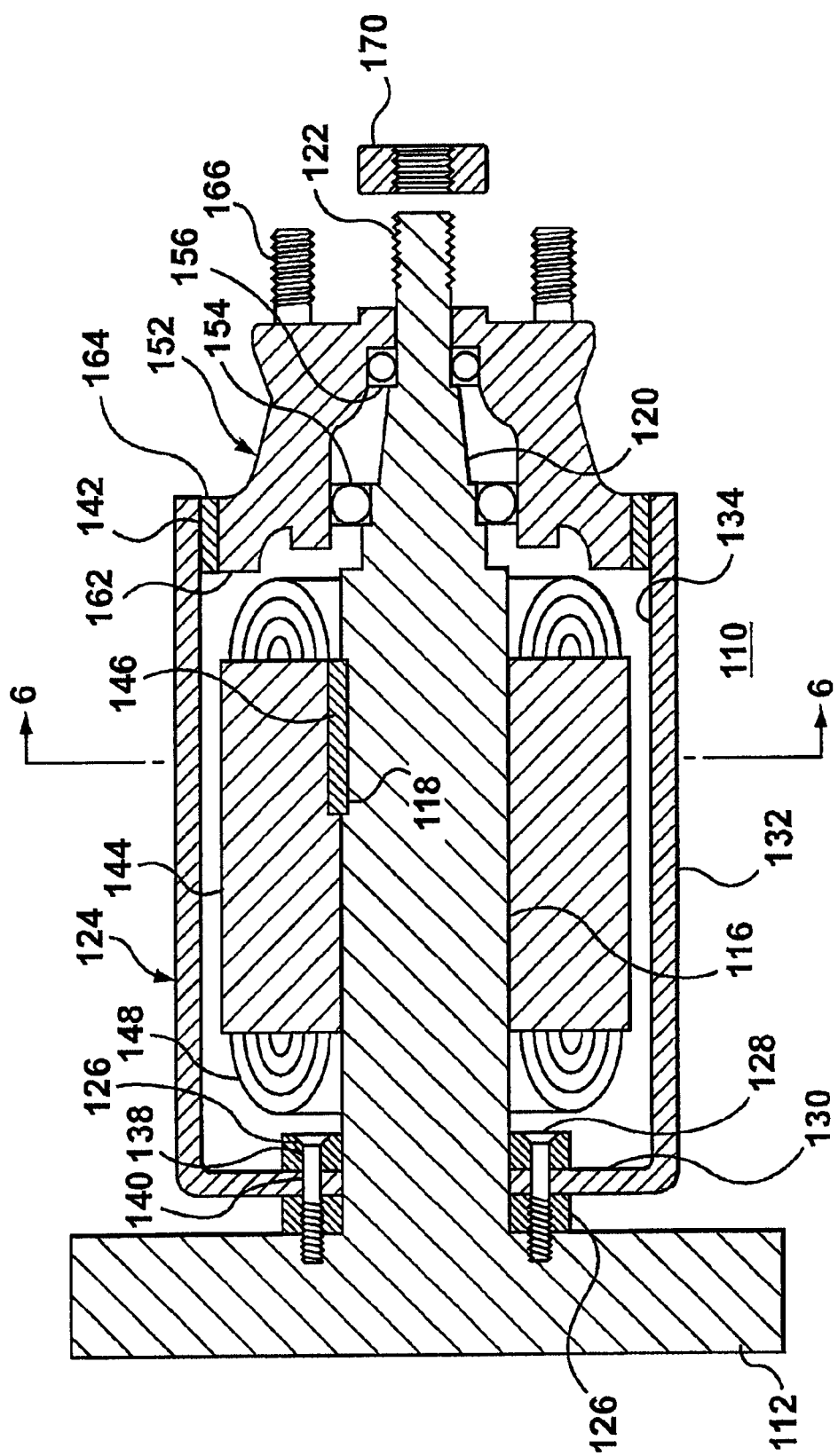
FIG. 2 is a cross sectional view of alternative construction to FIG. 1.

FIG. 2 shows the modification of the device of FIG. 1 wherein the ring gear (62 of FIG. 1) is equivalent to gear 162 located on the interior of flexispline 124. The core 144 is provided with winding 148 to provide the magnetic attraction of flexispline 124 toward core 144. The basic difference in operation of the devices of FIGS. 1 and 2 is that the flexispline 24 of FIG. 1 contacts the ring gear 62 at an angle of 90° from the point of maximum flux force produced by core 44, whereas the point of contact of flexispline 124 (FIG. 2) with ring gear 162 is coincident with the maximum flux force produced by winding 148 on core 144 in FIG. 2. This results in approximately 10% reduction in required flexispline deflection force for the same defleciton.

FIG. 4 and FIGS. 6A, 6B, 6C similarly describe the motor 110 of FIG. 2.

Figure 7:
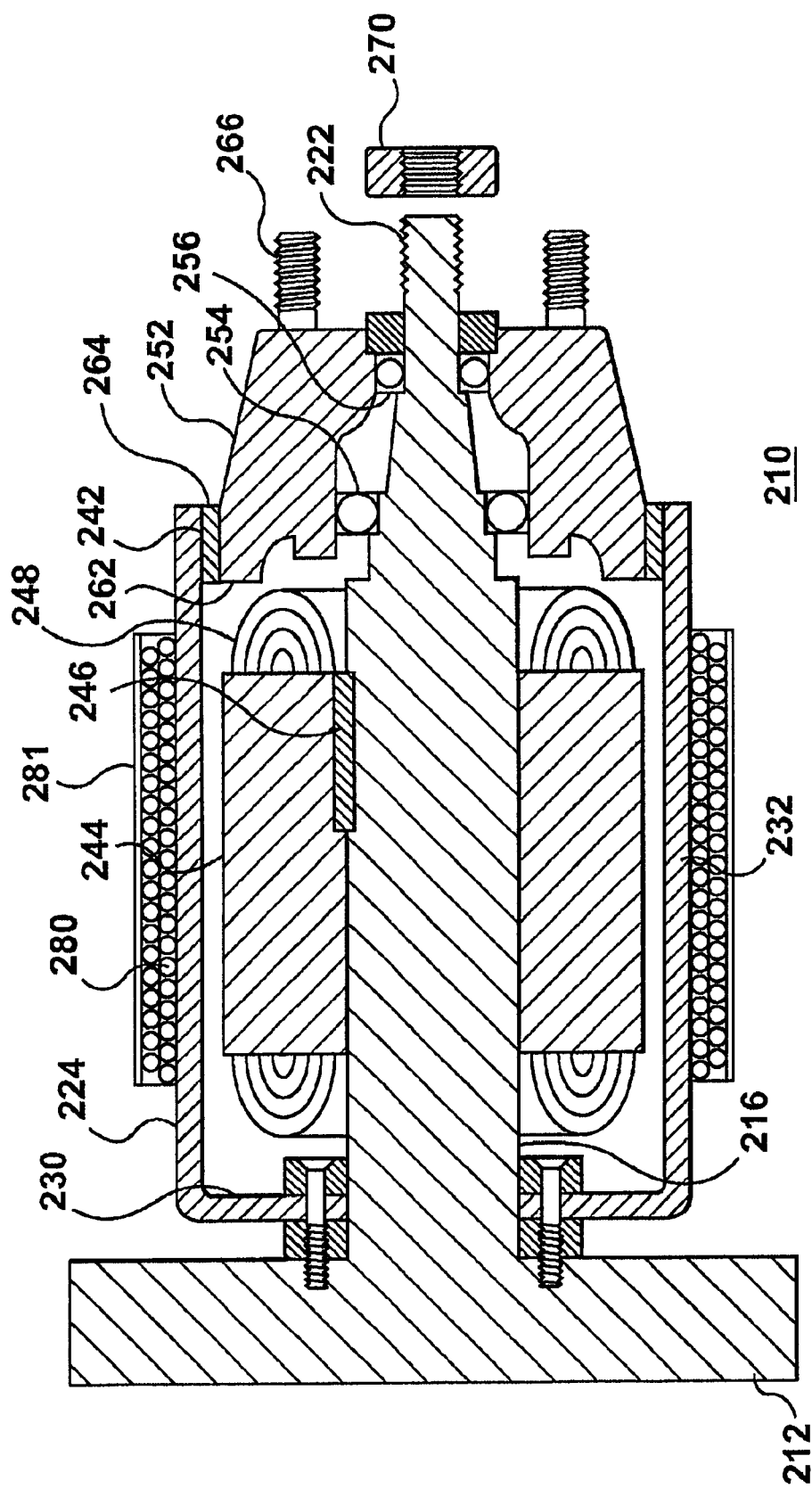
FIGS. 7, 8, 9, 10 show alternative constructions for flexispline motors.
Figure 8:
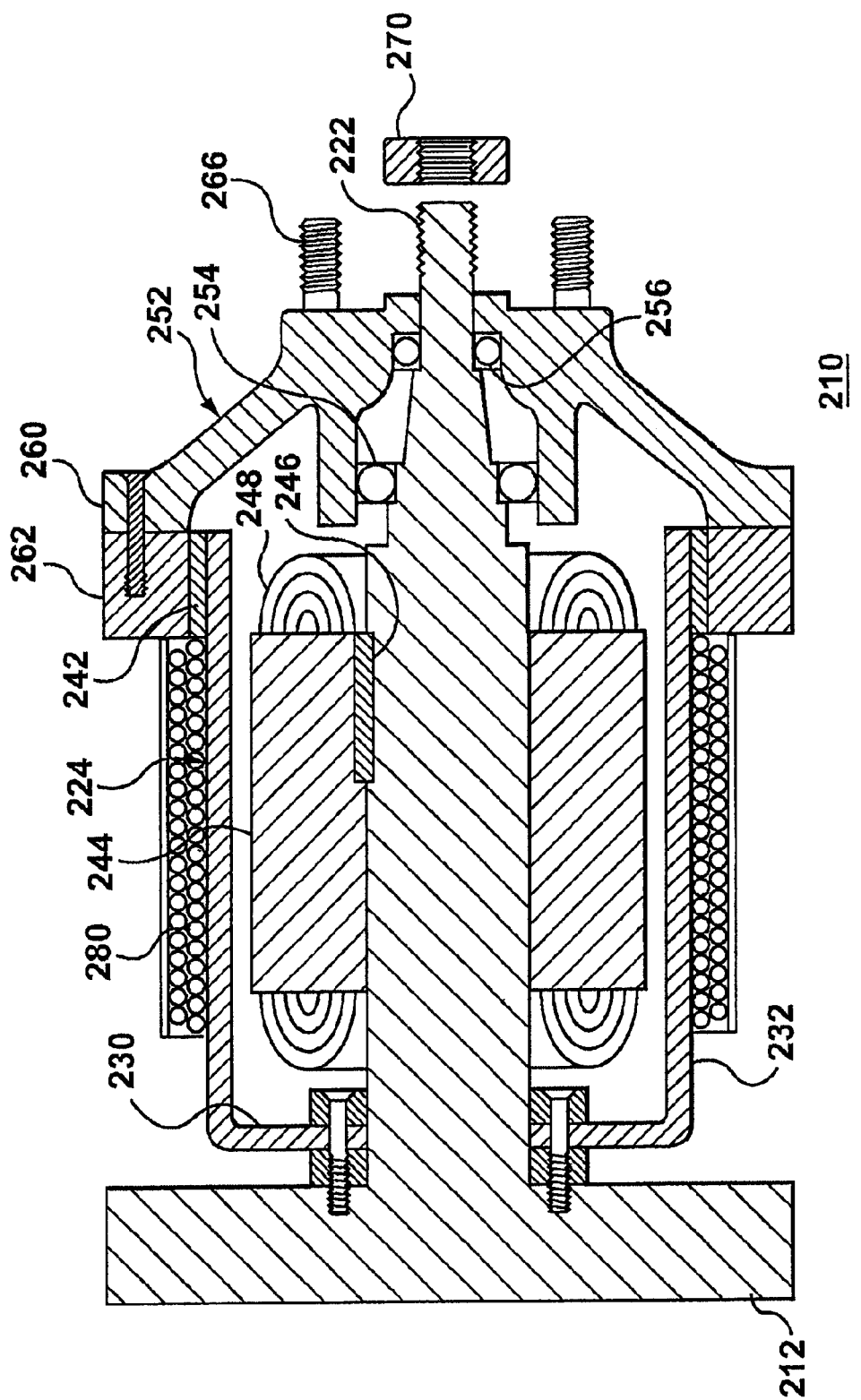

FIGS. 7 and 8 show an enhancement for the devices of FIGS. 1 & 2. Most of the components of FIGS. 7 and 8 are identical to the components shown in FIG. 1 and FIG. 2.

A flexispline 244 is mounted on base 212. Core 244 carrying winding 248 is mounted on post 216 and locked in place with key 246.

The major difference is the presence of a multi-layer wire and/or metallic tape winding 280 on the surface of flexispline 224. Winding 280 in this instance is shown having a circular cross section and is wound as a helix around flexispline 224. The winding 280 comprises a magnetic material to enhance the magnetic attraction of the flexispline 224 to core 244, to minimize the generation of eddy currents, and to increase flux flow area. In this context it is important to control the winding tension in such a manner so as to maximize the locked in radially stress (or pressure). This intern reduces the required flexispline distortion force. An alternative means of achieving this locked in radially stress is to shrink fit a collar or band of magnetic material around the solid or wound flexispline. Other alternatives include band type clamps with appropriate choice of flexispline cylinder geometry and locked in radial stress iti is possible to approach the critical buckling stress of the multilayered wound cylinder with 2,3, or 4 modal (lobar) buckling modes. Thus reducing the required flexispline radial deflection force.

The winding 280 may be wound and bound to the surface of the flexispline as in a filament winding process or as a preformed coil, which acts as the flexispline. In either case the objective is to minimize the stiffness of the flexispline-coil combination (to keep the distortions stiffness down to a acceptable level, whilst maximizing the area for the flow of magnetic flux).

To obtain a better fill factor and reduce the effect of radial air gaps in the wire layers, the wire comprising the winding 280 may have a square or rectangular cross section. Suitable compositions for the wire or tape comprising winding 280 are; Carpenters silicone iron B, HyperCo 15, or Honeywell amphorous metal 2605C0.

The turns of winding 280 should be insulated (preferably on the axial facing only) from each other to reduce eddy current flow in winding 280, usually the polimar binding formed on the turns comprising winding 280 is sufficient for this purpose. If not, an oxide or phosphate can be added to same. Note that there is no electrical continuity between the wire layers because the, wire ends at both ends of the flexispline 224 and thus forms an open circuit.

It may be expected that by the judicious selection of the magnetic material and the polymeric material binding the multilayer wire or tape forming winding 280 of motor 210, that the distortion stiffness of the combined metal flexispline 224 and winding 280 may be reduced by a factor of 3 or more in comparison with an equivalent solid metal flexispline. Similarly, increasing the helical wire-winding angle will also reduce the distortion stiffness of the flexispline. In this context it is important to control and lock in the winding tension in such a manner so as to maximise the locked in radial stress (or pressure), which in turn reduces the required flexispline distortion force. An alternative means of achieving this locked in radial stress is to shrink fit a collar or band of magnetic material around the solid or wound flexispline. Other alternatives include band type clamps. With appropriate choice of flexispline cylinder geometry and locked in radial stress it is possible to approach the critical buckling stress of the multilayered wound cylinder with 2,3 or 4 modal (lobar) buckling modes. This reduces the required flexplined radial deflection force.

Figure 9:
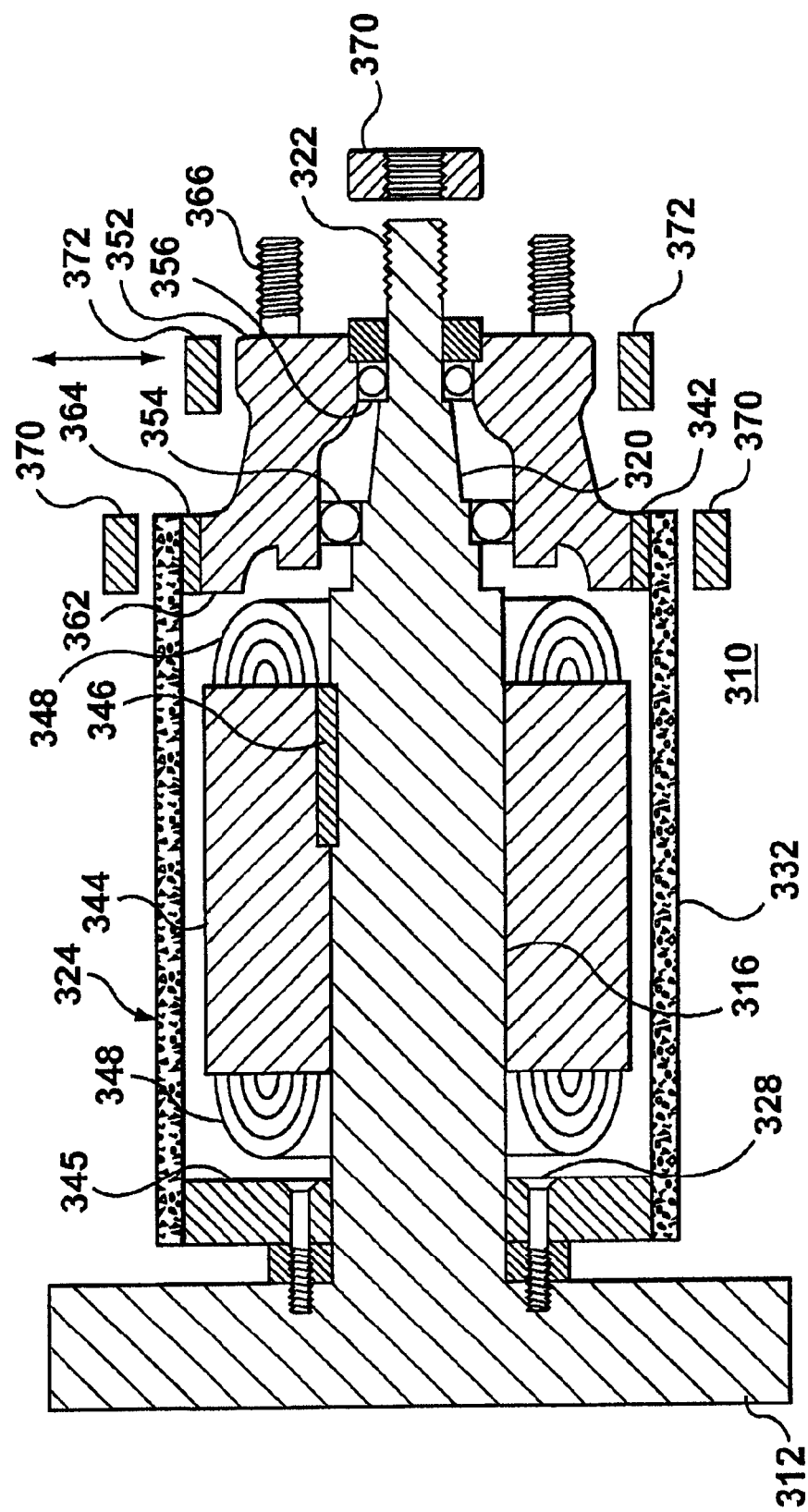

A flexispline motor 310, which is a modification of the flexispline motor 10 of FIG. 1, is shown having a composite cup 324 in FIG. 9. The cup 324 is composed of a composite of magnetic powder filled polymer or a polymer bound wire or tape wound magnetic material bonded to flange 345, which now functions as a torque transmission agent and fulcrum (lever pivot point) for the electromagnetic deflection of flexispline 324. Alternatively, the open-ended flexispline cup concept of FIG. 28, 29, 30. May be adapted.

A set of locking pads 370 and braking pads 372 are shown for arresting motion of the flexispline 324 and rotation of hub 352 if required.

Figure 10:
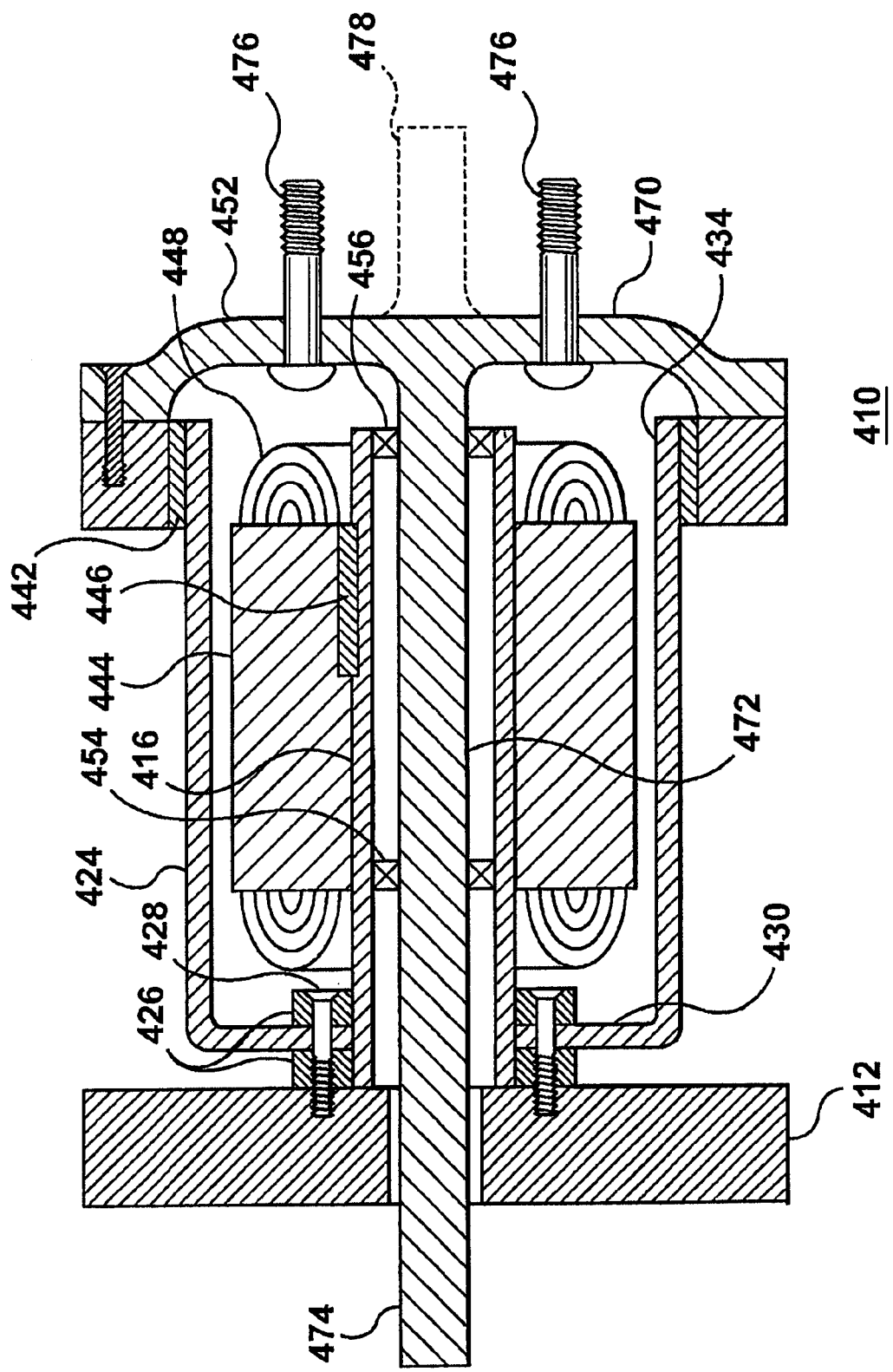

In FIG. 10, a flexispline motor 410 is shown mounted on base 412. A quill 416 is firmly mounted on base 412. A magnetic core 444 is securely mounted on quill 416 by means of key 446. Field excitation windings 448 are wound on core 444.

The end 430 of flexispline 424 is firmly attached to baseplate 412 by means of spacers 426 and screws 428 as to be coaxial with quill 416 in its rest position. At the remote end 434 of flexispline 424 is a band gear 442, which encircles the open end of flexispline 424 on the exterior surface thereof.

A driven element 452 is mounted in bearings 454 and 456 inside quill 416. Driven element 452 comprises a disc 470 attached to shaft 472 which extends through base 412 to form sharp projection 474, and disc 470 may carry wheel studs such as 476 or a shaft extension such as 478 (in the absence of studs 476).

This construction allows the flexispline motor 410 to be adaptable to drive a load from either or both ends simultaneously.

An overwrap winding similar to winding 280 may be incorporated into the structure of flexispline 424 to improve its magnetic characteristics. Of course, the motor structure may take the form of the flexispline motor in FIG. 2 wherein the flexispline 424 would surround the ring gear.

Figure 11:
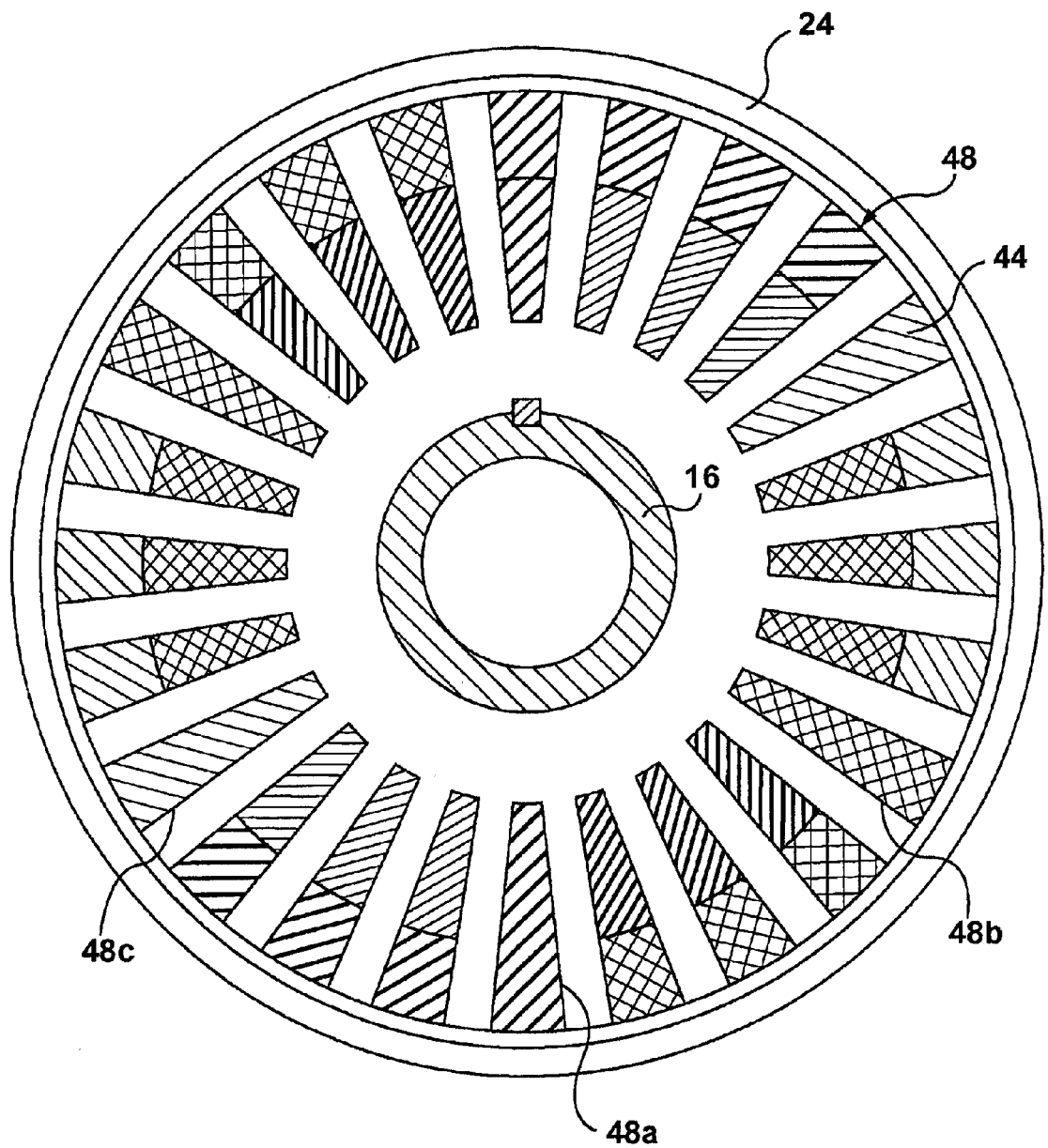
FIG. 11 is a sectional view of a flexispline and core shown at 6-6 in FIG. 1 and FIG. 2.

FIG. 11 is a representation of the Section 6-6 shown in FIG. 1. The flexispline 24 is shown surrounding the core 44. Three windings 48a, 48b and 48c comprise winding 48. This is a three phase, sinusoidally-distributed, winding, which is a traditional winding. The three phase windings 48a, 48b and 48c are distributed about the core 44 in a well-known. manner. This winding, will serve to deflect the flexispline in the manner described previously. Variable speed and torque control of this winding version can be achieved by means of commercially-available modified electronic A.C. induction-motor controllers. However, the resulting output power, torque and efficiency tend to be disappointing.

Figure 12:
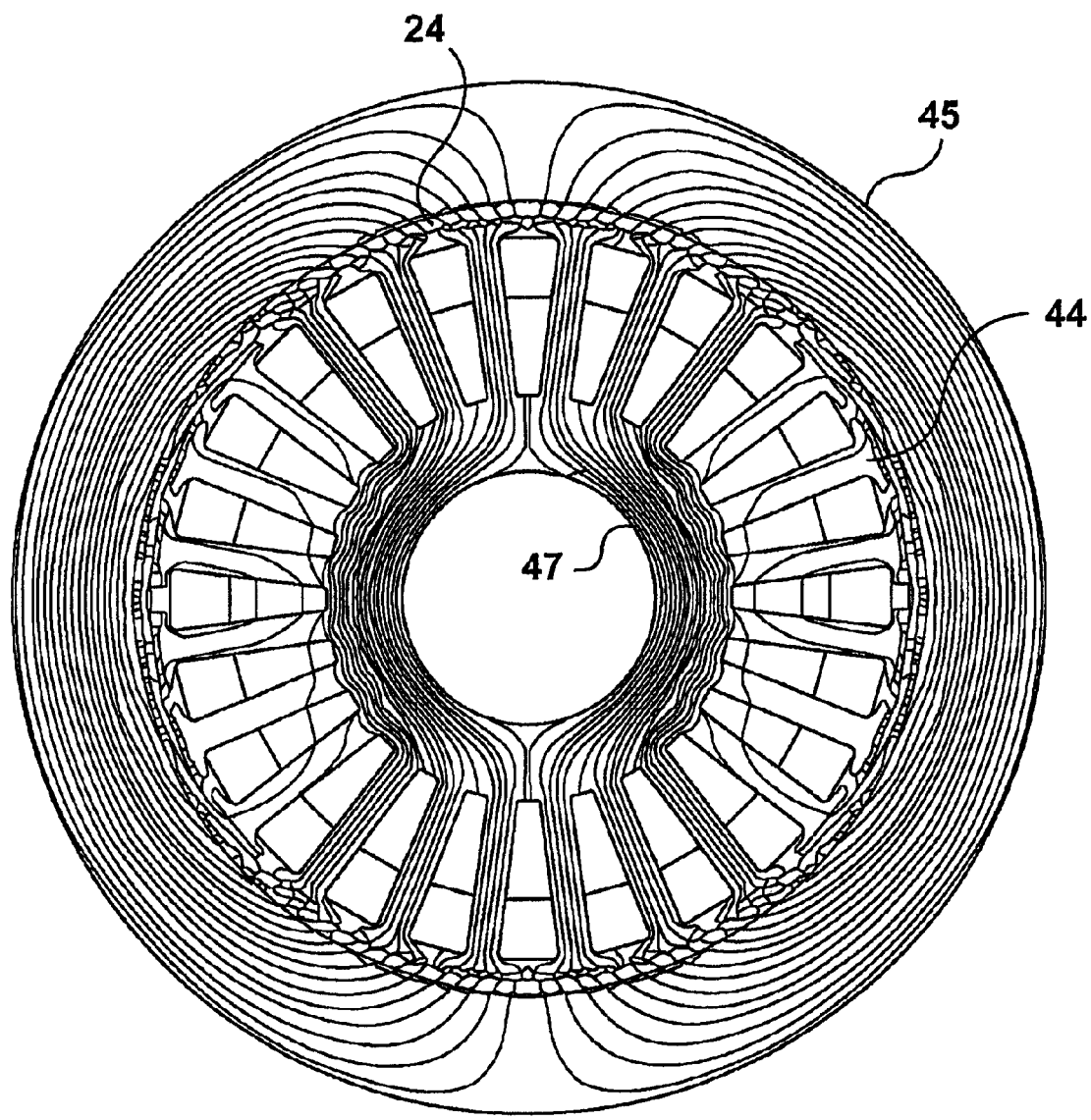
FIG. 12 is an illustration of the flux flow of a conventional polyphase sinusoidally excited flexispline motor having internal and external core assemblies, with dumbbell-shaped stator core teeth.

FIG. 12 shows the flux distribution for a flexispline motor having a polyphase two pole winding such as FIG. 11 excited by a sinusoidal signal. The core 44 is surrounded by a flexispline 24 (and in this instance an additional flux return path is provided by outer cylindrical core 45).

It is to be noted that the flux traverses the entire core 44 thus core losses are inevitable where the flux passes in and through hub 47. The windings 48a, 48b, 48c, have bulky end turns (which occupy an inordinate amount of space) at each end of the core 44. This also gives rise to substantial energy loss and heat generation in the stator core and the end windings of 48a, 48b, 48c. Additionally, the dumbbell shaped stator teeth significantly reduce the applied radial distortion force. For these reason and other commutation problems, polyphase excitation winding are not the preferred embodiment for this invention.

Figure 13:
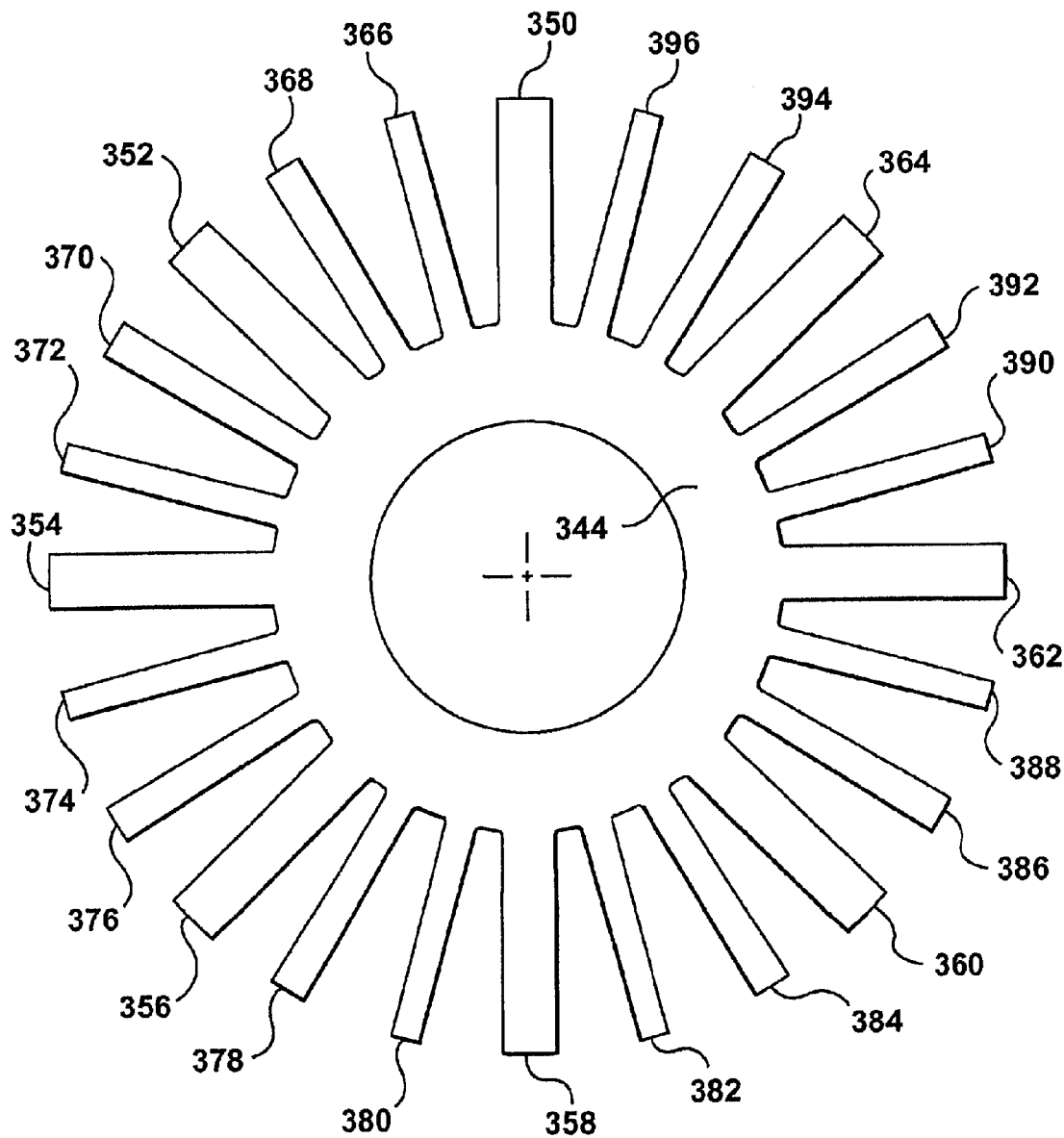
FIG. 13 shows a core punching component of a purposed flexispline motor, with straight stator core teeth, and concentrated magnetic flux

It is proposed to use the core composed of stacked punchings such as those illustrated in FIG. 8 to excite the flexispline for some of the alternative embodiments of this invention. FIG. 13 shows a core punching 344 having an even number of core teeth but the teeth of the punching are shown having variable widths. Core teeth 350, 352, 354, 356, 358, 360, 362, and 364 each have two teeth such as 366 and 368 interspersed there between. The core 344 is symmetrical in that this pattern is repeated throughout the core 344.

Figure 14:
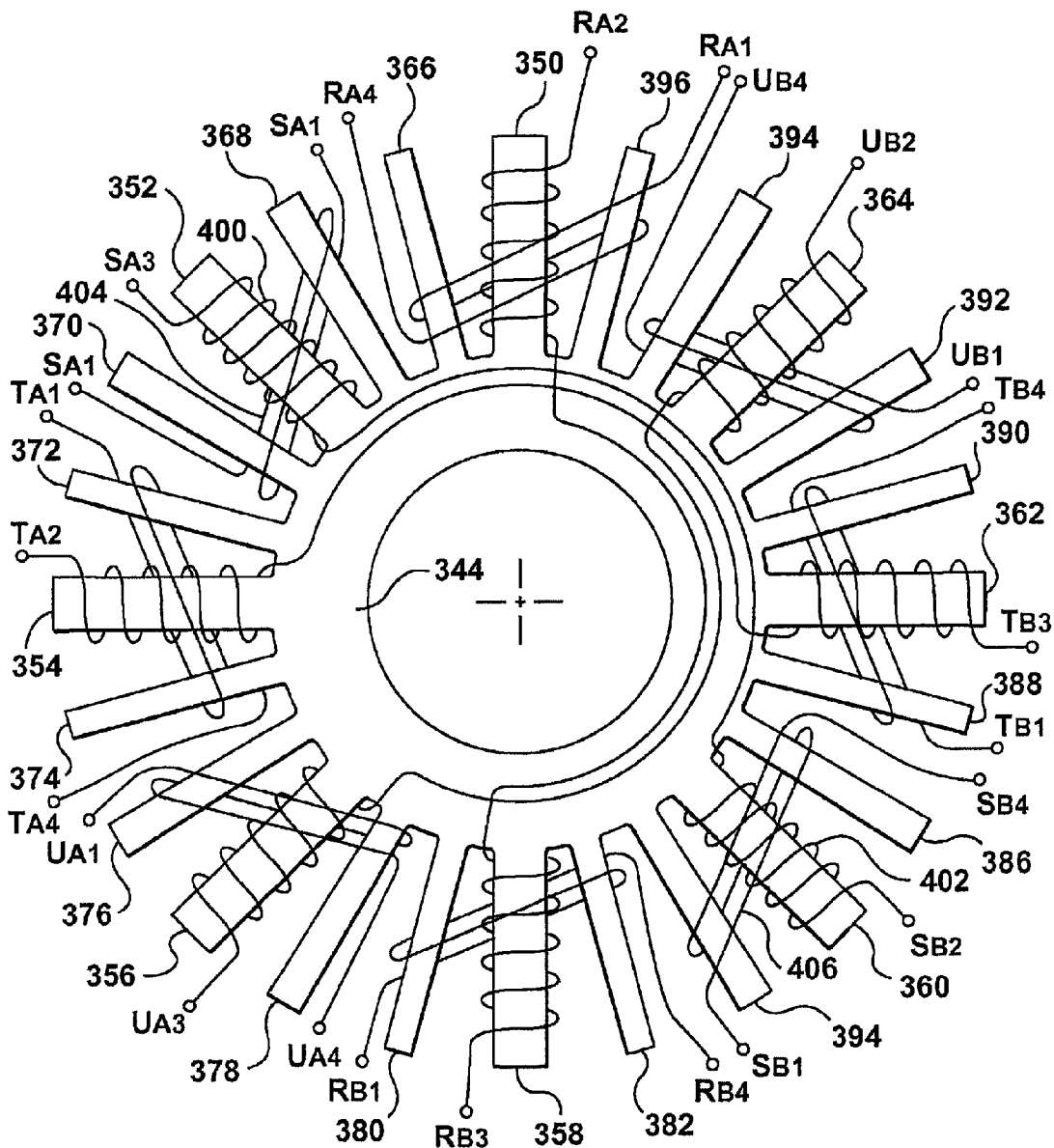
FIG. 14 shows a winding configuration for a core composed of the punchings of FIG. 13.

FIG. 14 shows core 344 having a four phase 2 pole, reluctance motor type winding wound thereon which will be excited by a switched D.C. 4 phase excitation having each phase separated by 45° mechanical.

Since the windings and core 344 are symmetrical, only one phase will be described in detail. Tooth 352 is supplied with a winding 400 which surrounds only the tooth 352. Winding 400 is connected in a series. bucking relationship (to ensure opposite magnetic flux flow directions) with winding 402 on opposing tooth 360. These windings are energized between terminals A-A1. A pair of windings 404 and 406 are wound on core 344 to encompass teeth 368,352,370 and 384,360,386 respectively. These windings are energized simultaneously with windings 400 and 402 to produce more concentrated flux in the area of teeth 352 and 360.

The other three pole pairs are energized in 45 degree increments sequentially to move the flux pattern around through 360° to cause a wave deflection of the flexispline.

Figure 15:
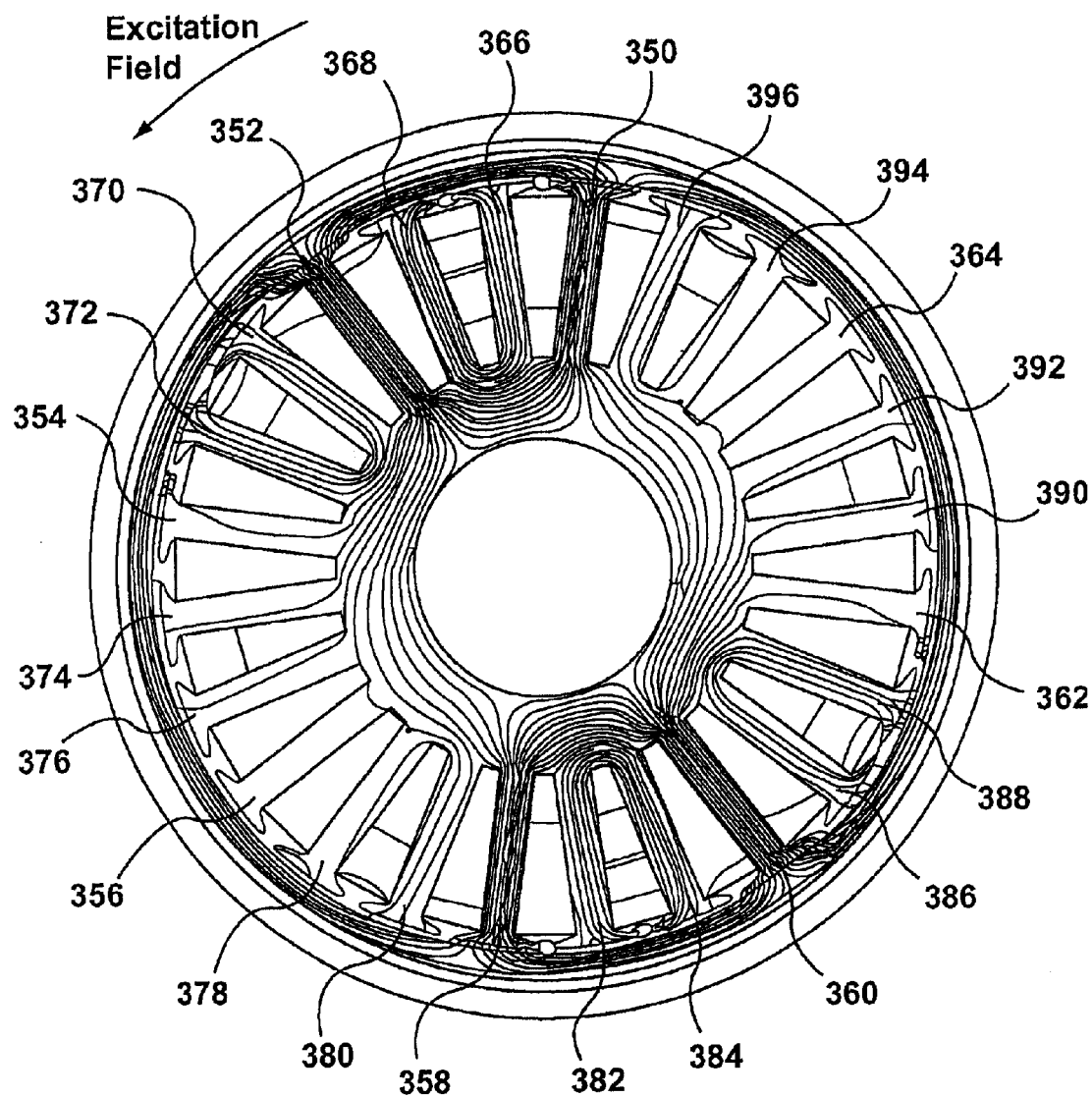
FIG. 15 shows the flux pattern for a flexispline core similar to FIG. 14.

FIG. 15 shows the flux flow pattern for the coils 400, 404, 402 and 406 on dumbbell shaped non variable width core teeth 352, 368, 370, 360, 384 and 386 being fully energized with the coils surrounding teeth 350, 366, 396, 380, 358 and 382 being partially energized. Note that the flux flow pattern is completely different from that illustrated in FIG. 12. The greatest concentration of flux is in teeth 352 and 360 which is shown linking adjacent teeth 350 and 358 instead of passing through the core hub as shown in FIG. 12. Also, the dumbbell shaped core teeth reduce the pole tip magnetic flux density and thus reduce the applied flexispline delfection force in a major way. For these reasons variable width straight teeth are the preferred embodiment.

Figure 16:
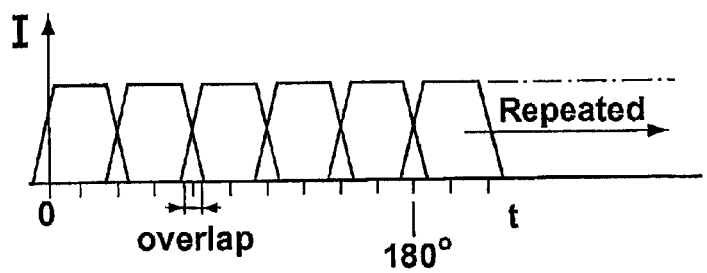
FIG. 16 shows a typical current flow in the four phases of winding assembly shown in FIG. 14.

The energizing current for the coils is illustrated schematically in FIG. 16. This current wave form is a switched DC current produced for each set of pole pair windings such as 400, 404, 402, 406 which produces a gradual rotational distortion of the surrounding flexispline. Without the overlap of the various phase currents in the windings of the core as shown in FIG. 16 the distortion of the flexispline tends to occur in discrete steps. Additionally, this overlap (phase advance) has to increase with increasing output rotational speed to compensate for the field coil flux build up time constant. Of much greater importance however, is the current cut off point (current pulse trailing edge), when the field coil current reverses direction to discharge stored energy this results in negative torque and the current must be cut off. The appropriate control strategy is shown in FIG. 32 resulting in a truncated current wave form. This control strategy is effected by the circuitry of FIG. 31, accompanied by appropriate commutation signals generated for instance by Hall effect devices.

The frequency and amplitude of the various currents should be controlled to adjust the speed and radial force of the distortion wave of the flexispline. Suitable circuitry in block diagram form adaptable to achieve such control is shown in FIGS. 31A, 31B, 31C, 31D (Ref. Texas Instrument Literature in BARA058 July 1977)

While windings such as 409, 402, 404, 406, etc., will function to cause the desired continuous wave distortion of the flexispline 24 of the motors 10, 110 and 210. However, there are some more less expensive windings which are capable of producing the distortion of the flexispline with less input energy to the magnetic system, and are adaptable to 2, 3, or 4 lobe flexispline distortion.

Figure 17:
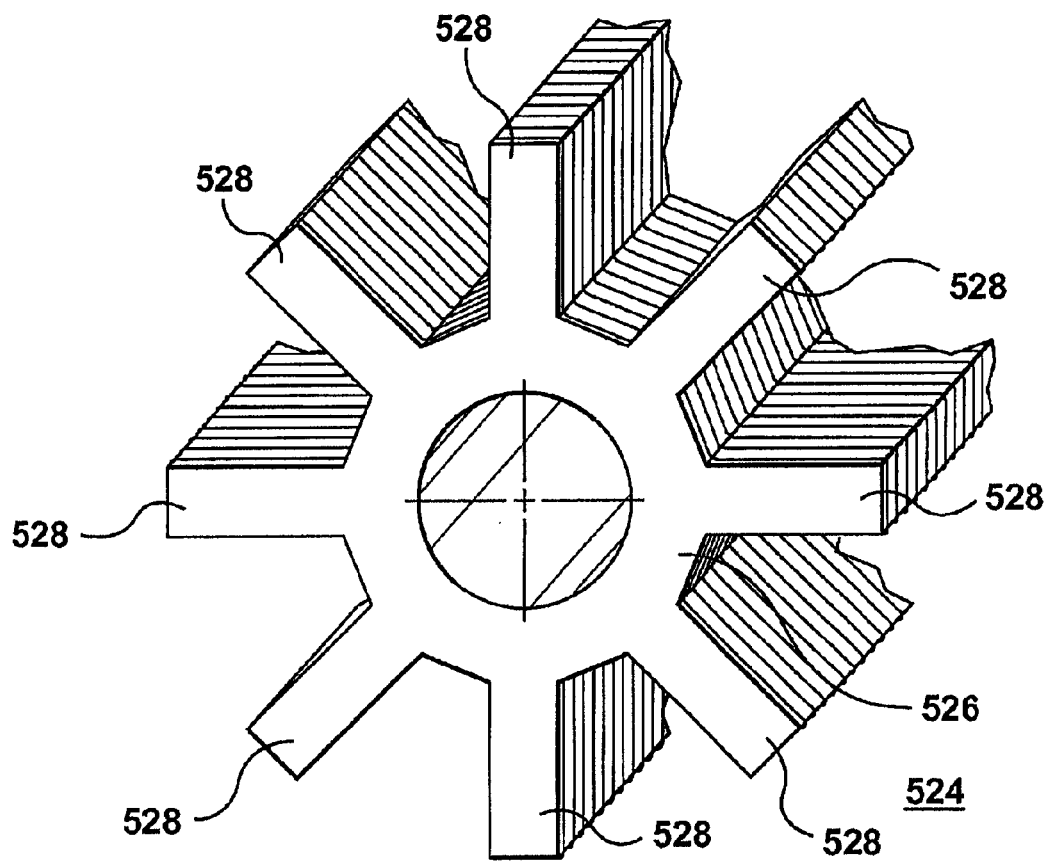
FIG. 17 is a representation of an eight legged magnetic core alternative less expensive structure.

FIG. 17 shows a magnetic core 524 for a flexispline motor application such as shown in FIGS. 1, 2, 7 and 8 in which the core is energized in a completely different manner than the core coil system shown in FIG. 11. FIG. 17 represents a partial perspective of a core to be used in a Switched Reluctance type Magnetic System. The core 524 comprises a hub 526 and spokes 528 arranged in a spaced configuration comprising stacks of laminations to produce, in this instance, a magnetic core having eight poles.

Figure 18:
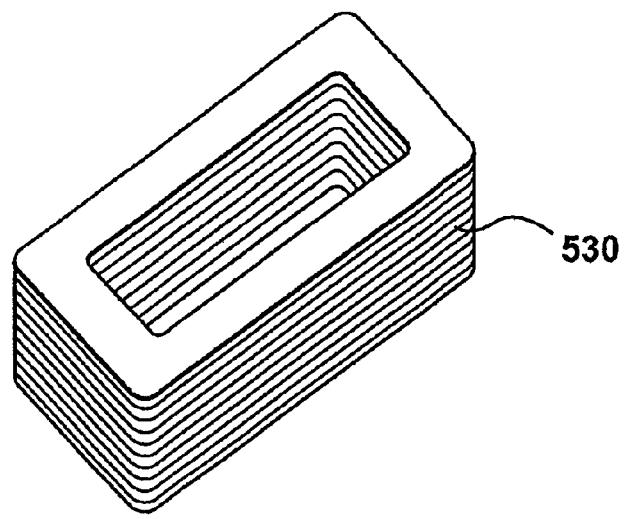
FIG. 18 is a perspective view of a winding shaped to fit over one of the core legs of FIG. 17.

FIG. 18 shows a typical winding coil 530 for any of the legs 528 of the core 524. Winding 530 is made to slip over the. selected leg 528 of core 524. Each pole 528 is fitted with a formed coil such as 530. In all there will be eight such coils 530 placed over the individual of the core 524, for four or eight phase excitation, and two or four flexispline rotor poles (similarly six coils/poles for three phase excitation with two or three rotor poles). Such arrangements allow the potential for electromagnetic gear change ratio on the fly.

Figure 19:
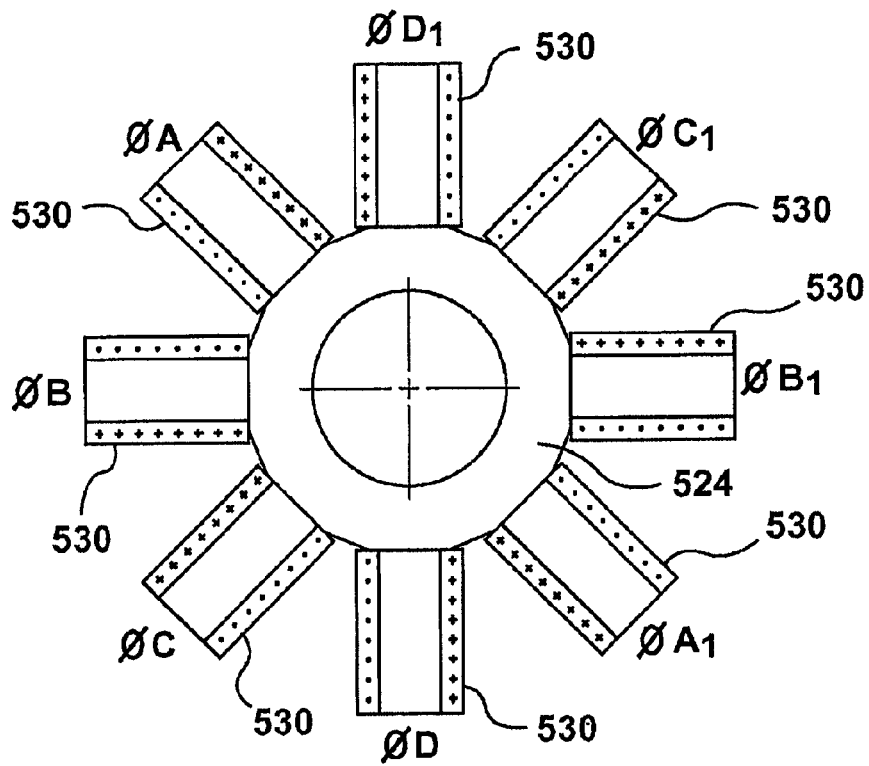
FIG. 19 is an illustration of the core of FIG. 17 fitted with the coils of FIG. 18.
Figure 20:
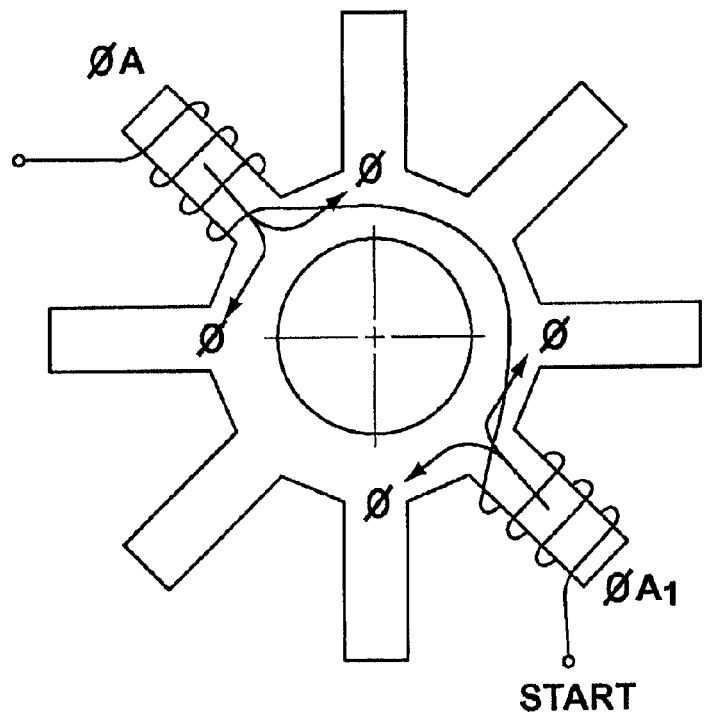
FIG. 20 is a simplified wiring circuit for the core of FIG. 17.

FIG. 19 shows the core 524 having coils 530 placed over each leg; note the wiring sequence. Coil 530 which is placed on the ØA leg of core 524 produces flux in the opposite direction as its series connected mate ØA1. The actual winding configuration for 2 poles is shown more simplistically in FIG. 20. Here the magnetic flux produced in legs ØA and the ØA1 is in direct opposition in the core. The remaining pairs of the six remaining poles are connected in pairs in a similar manner to ØA and ØA1. With each successive pole coil pair being wound in opposite magnetic flux flow directions to the previous pair.

Figure 21:
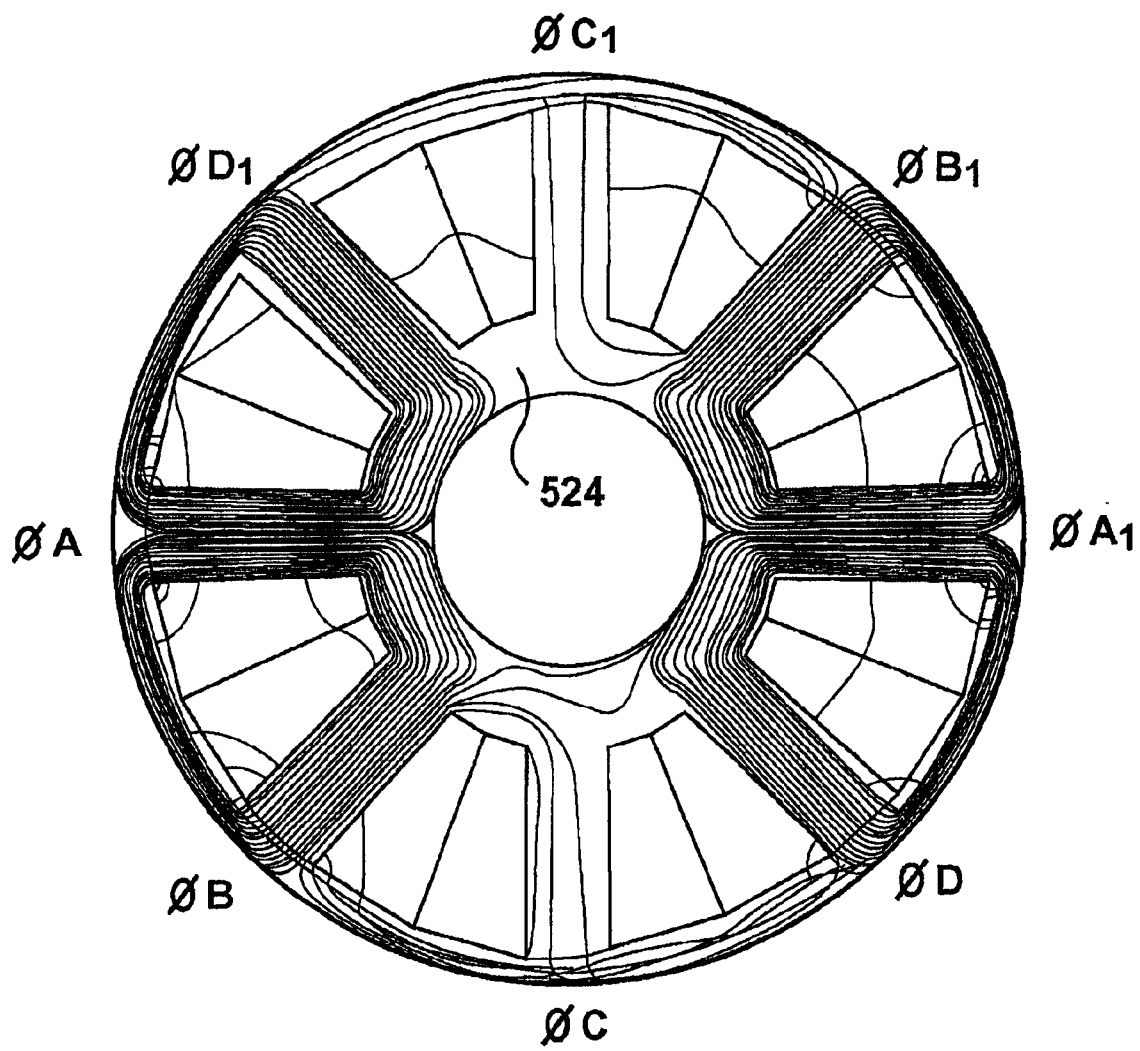
FIG. 21 shows the typical flux distribution for the wired core of FIG. 20.

FIG. 21 is a representation of the flux produced in the four phase switched reluctance core 524. Note how the flux produced in the ØA and ØA1 legs of core 524 is in direct opposition. The flux produced in the ØA divides and splits to link the ØB and ØD1 legs. Similarly the flux produced in the ØA1 let splits and links the ØD leg and ØB1 leg. None of the flux produced in the ØA leg links the ØA1 leg as in the conventional sinusoidally distributed winding illustrated in FIG. 11, thus reducing magnetic flux saturation requirements. However it is obvious from FIG. 21 that the flexispline thickness should be increased to accommodate flux flow similar to the core teeth.

Energization of the coils ØA, ØB, ØC, ØD is straightforward. The complementary coils ØA and ØA1 are connected in series opposition, as are the balance of the coils. A four phase switched D.C. power supply is therefore required to produce a magnetic field which results in the production of a continuously moving distortion of the flexispline. The power supply should have both magnitude and frequency control to produce an output suitable for driving the flexispline motor for variable speed operation. Along with appropriate commutation as shown in FIG. 32.

Figure 22:
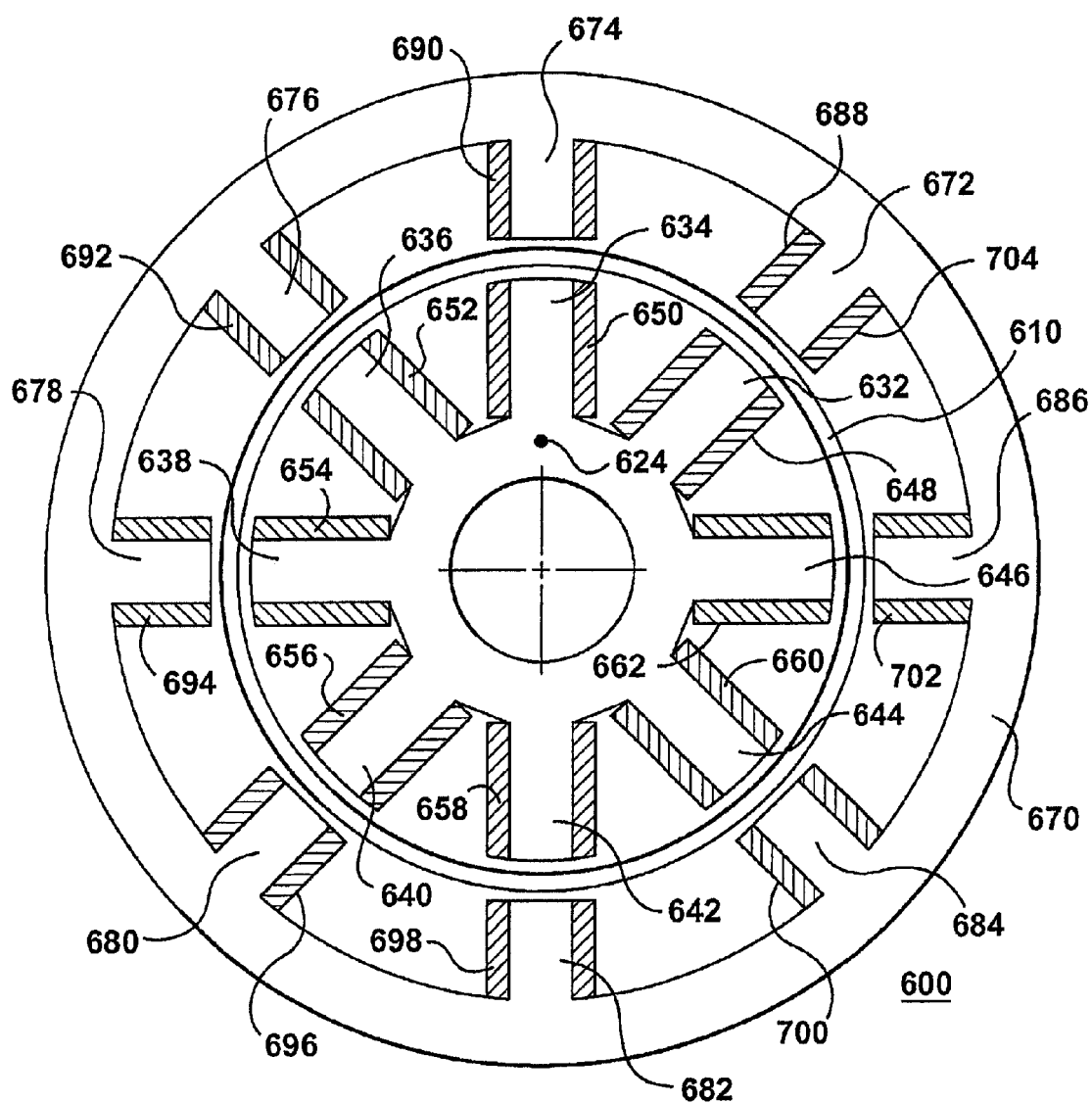
FIG. 22 shows an illustration of a double core switched reluctance flexispline motor.

FIG. 22 shows a representation of a double core switched reluctance type flexispline motor 600. Here an inner core 624 is provided with eight protruding poles (similar to core 524) numbered 632, 634, 636, 638, 640, 642, 644 and 646. Poles 632-646 are energized in exactly the same manner as poles ØA-ØD etc. of FIG. 19 with coils 648-660 being energized so that the flux produced in opposing poles (such as 636 and 644) is bucking.

All the flexispline motors illustrated in FIGS. 1, 2, 7, 8, and 14 are provided with a core contained within the flexispline itself. The flexispline motor 600 is provided with an external core 670 which is composed of a series of stacked laminations which are formed into a unitary structure by techniques well known in the art. Core 670 is provided with eight poles 672-686 which face poles 632-646. Poles 672-686 are provided with coils 688-704. Flexispline 610 is mounted coaxially with and midway between the poles 632-646 and 672 and 686.

When coils 648 and 656 produce flux in a series bucking relationship, coils 692 and 700 are simultaneously energized to produce a magnetic pull (spaced 90° mechanically) on the flexispline 610 mounted between the cores 624 and 670. The poles 692 and 700 are in space quadrature with poles 648 and 656. While poles 648 and 656 pull the flexispline 610 inwardly, poles 692 and 700 pull the flexispline outwardly to increase the force of engagement of the flexispline 610 with its associated ring gear (not shown).

This arrangement also permits the coupling of a flexispline having 2 sets of band gears, one on the inside, and one on the outside of the flexispline to engage an internal ring gear and an external ring gear simultaneously. This would give rise to driving 2 loads with different gear ratios.

The exterior core 670 should be securely mounted on a base (such as 12 in FIG. 1) to hold the exterior core 670 in coaxial alignment with interior core 624 and flexispline 610.

This arrangement will serve to increase the force of engagement of the flexispline and its associated ring gear. This double excitation arrangement will also function with the control strategy of FIG. 31 and FIG. 32. All that is required is an exterior core, the poles of which produce a magnetic field in space quadrature with the field produced by the interior core 48. This provides the necessary distortion of flexispline 610.

Figure 23:
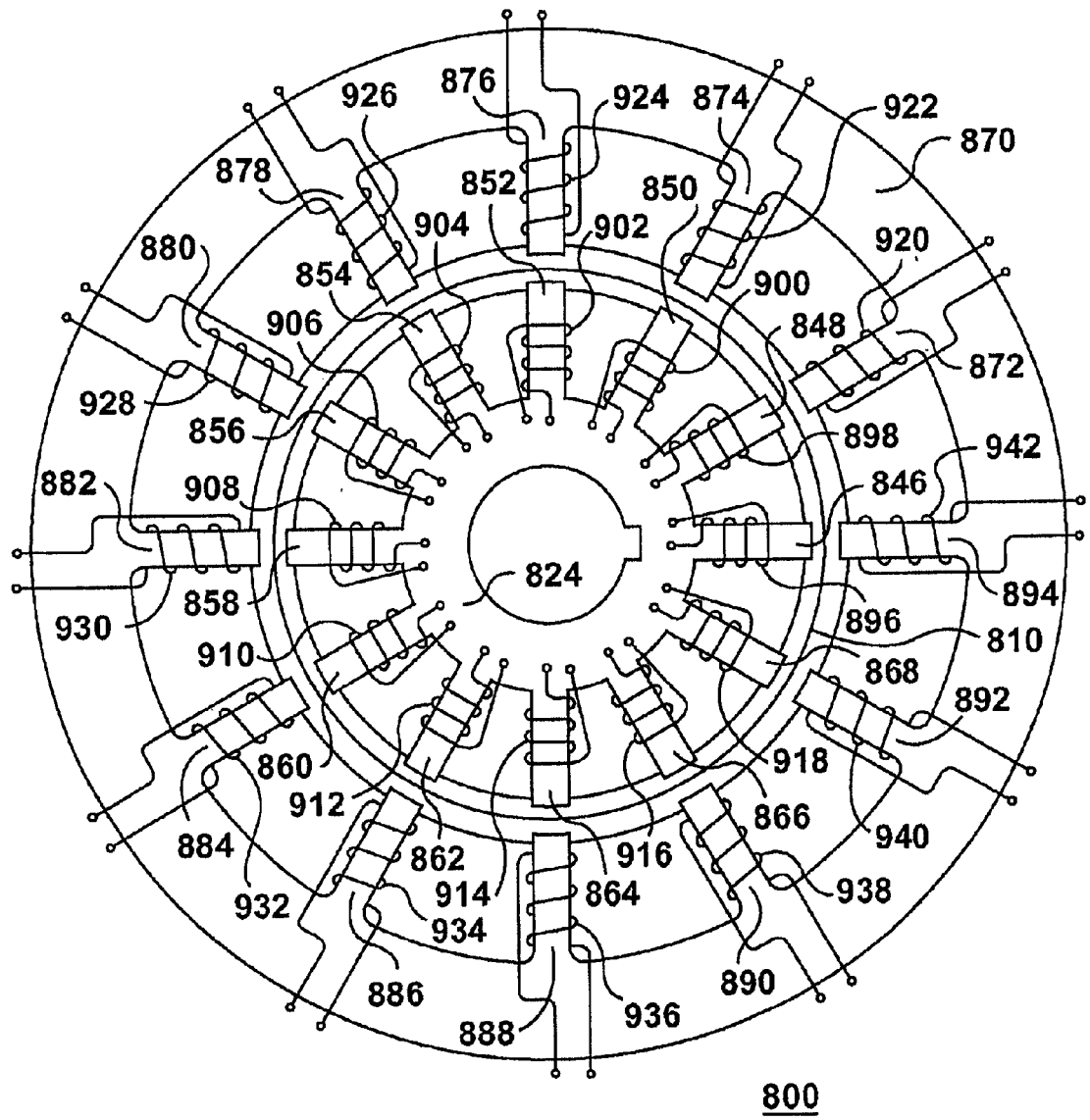
FIG. 23 shows a flexispline motor of a tricornal flexispline configuration.

FIG. 23 is a representation of a pull-pull flexispline motor having a six phase, three pole pull-pull type excitation, which is also capable of four or two pole excitation. The three pole version will now be dexcribed. Motor 800 is provided with a flexispline 810, and an inner core 824 having twelve protruding poles (similar to core 624) numbered 846-868. Surrounding flexispline 810 is a stationary stator core 870 having poles 872-894 protruding inwardly therefrom.

Poles 846-868 are provided with windings 896-918 and poles 872-894 are provided with windings 920-942 respectively. At rest, as shown in FIG. 23, the flexispline 810 assumes a round shape and the gear teeth (not shown) of flexispline 810 Which are integral with flexispline 810 do not engage the ring gear (not shown in FIG. 23). Thus at rest the flexispline 810 assumes a circular shape in the unexcited state.

Figure 24:
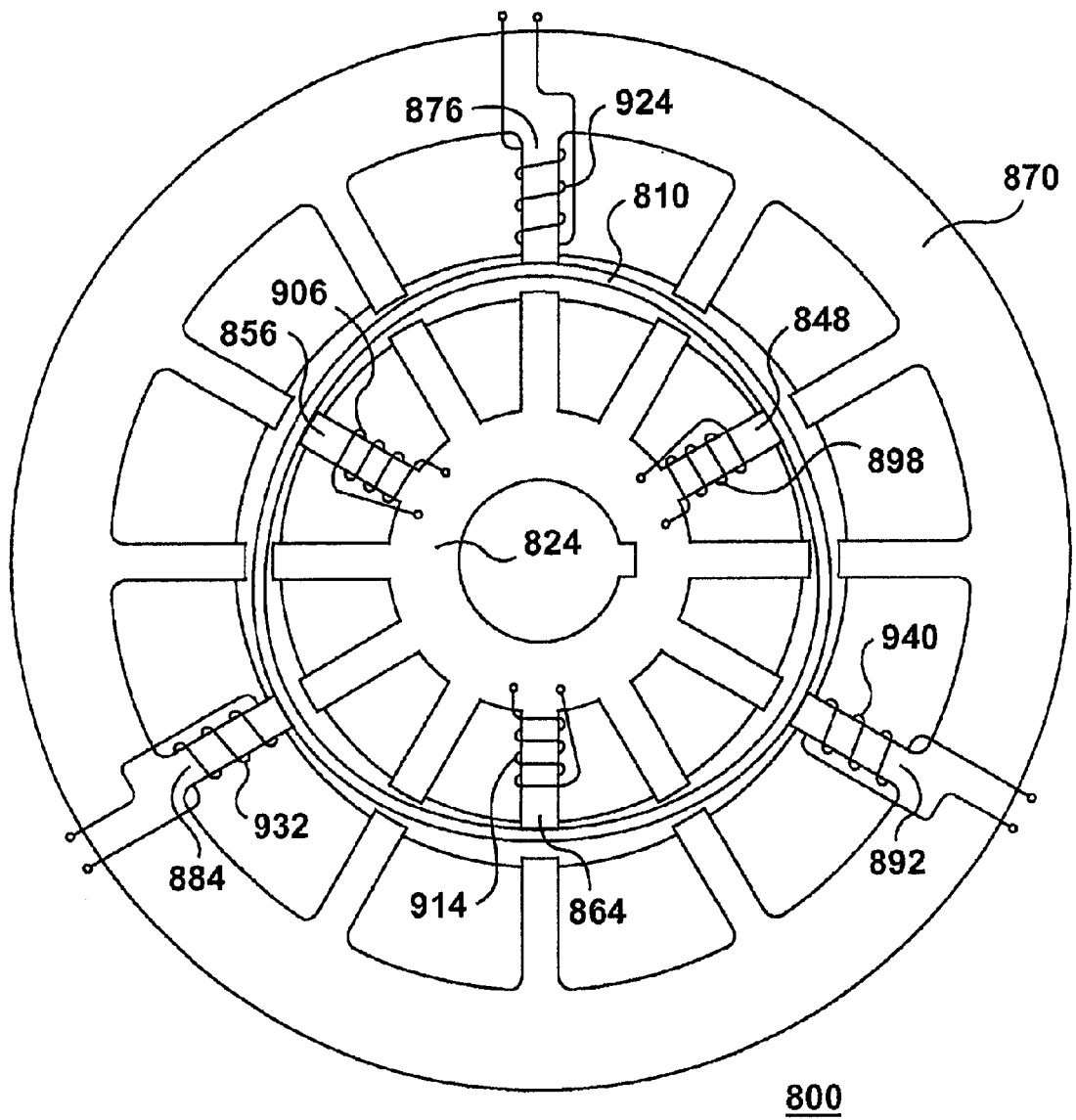
FIG. 24 shows the motor of FIG. 23 with one set of poles energized.

FIG. 24 illustrates the resultant shaping of flexispline 810 when one of the four phases is energized.

Here inner poles 848, 856 and 864 are energized by windings 898, 906 and 914 so as to deflect flexispline 810 inwardly, while outer poles 876, 884 and 892 carrying windings 924, 932 and 940 respectively distort the flexispline outwardly to produce a tri-mode engagement with the flexispline 810 and. its ring gear or gears.

Figure 25:
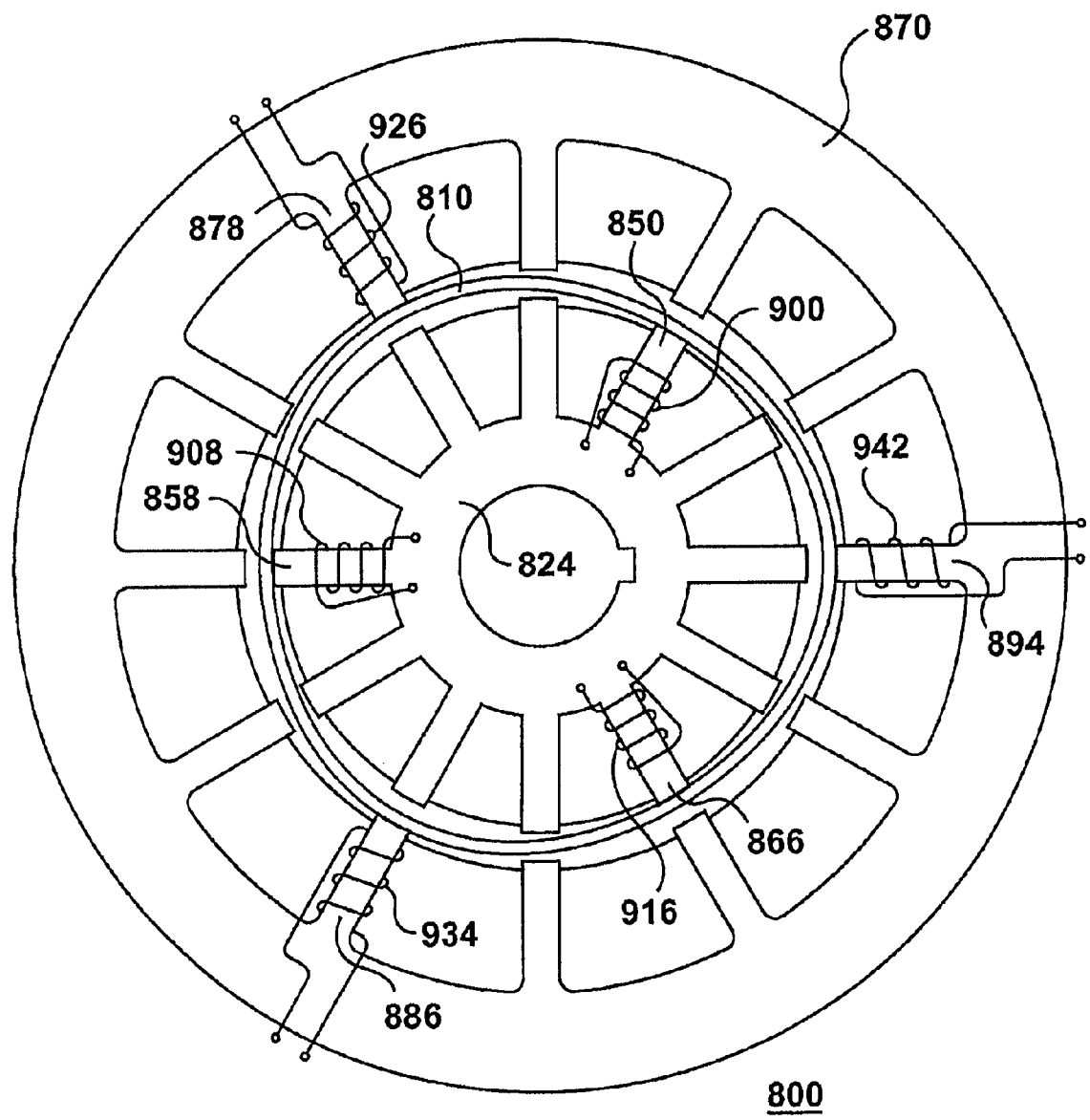
FIG. 25 shows the motor of FIG. 23 with a second set of poles energized.

FIG. 25 shows the energization of the next phase when coils 900,908 and 916 of inner poles 850, 858 and 866 are energized.

Simultaneously coils 926,934 and 942 on outer poles 878, 886 and 894 are energized to move the distortion wave ahead 1 pole from that shown in FIG. 24.

Figure 26:
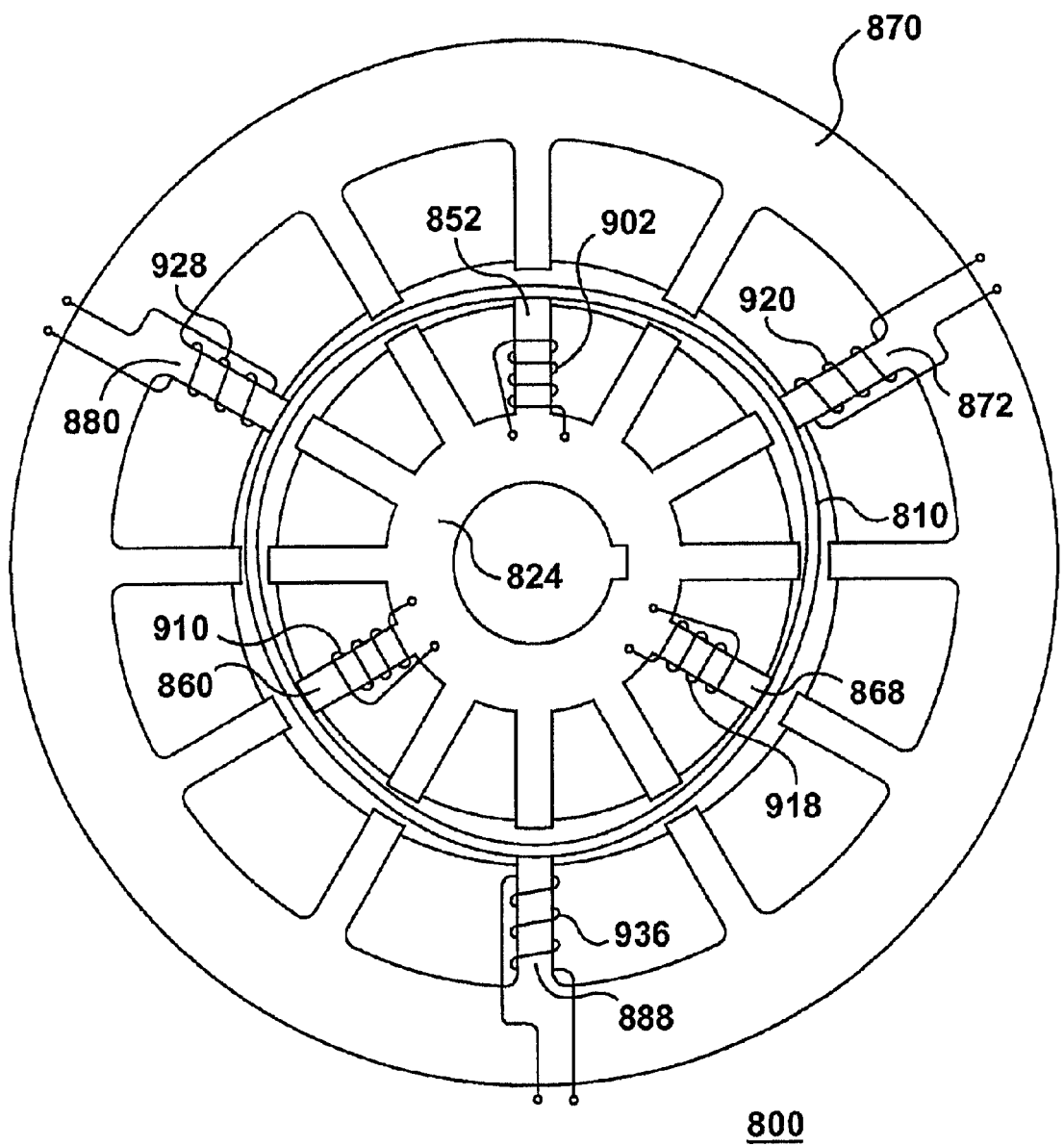
FIG. 26 shows the motor of FIG. 23 with a third set of poles energized.

FIG. 26 shows the energization of the six poles of the next phase and the resulting distortions of the flexispline 810.

Figure 27:
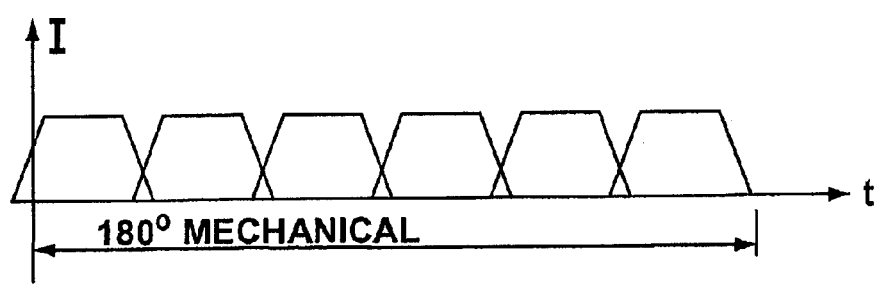
FIG. 27 shows a preferential wave form for current supplied to the excitation poles of the motor of FIG. 23.

Thus the distortion of the flexispline moves through 120 space degrees for the successive sequential energization of four poles. Energization of the respective poles is provided by using chopped pulses of dc such as shown in FIG. 27. Using the circuitry of FIG. 31, FIG. 32 and appropriate commutation signals. If the tooth differential between the flexispline and the ring gear (assume the ring gear is external to the flexispline) is 3, then for 1 complete excitation mode excursion through 360 deg (space) there are 2 cycles of energization of each coil of the motor 800. This will advance the ring gear by 3 teeth during one excursion of the tricornal shape of the flexispline. In a flexispline such as shown in FIGS. 1, 2, 7, 8 and 14 where the difference in teeth between the flexispline and ring gear is two teeth, the ring gear would advance only 2 teeth so that the tricornal shape lessens the gear reduction ratio.

Up to this juncture the various flexispline motors have generally embodied a cup shaped flexispline arrangement (a cylinder with one end open the other end closed). The main function of this cylinder is to transfer the full output load reaction torque from the band gear teeth 42 (ref. FIG. 1) back to the base plate 12 (FIG. 1), in addition to facilitating elliptical or tricornal distortion of same. This function requires the cylinder (flexispline) to possess adequate shear stiffness (thickness) in order to transfer the output load torque. This in turn, along with the closed cup end generally increases the flexispline distortion resistance, which in turn reduces output torque and efficiency. A new embodiment will now be described.

Figure 28:
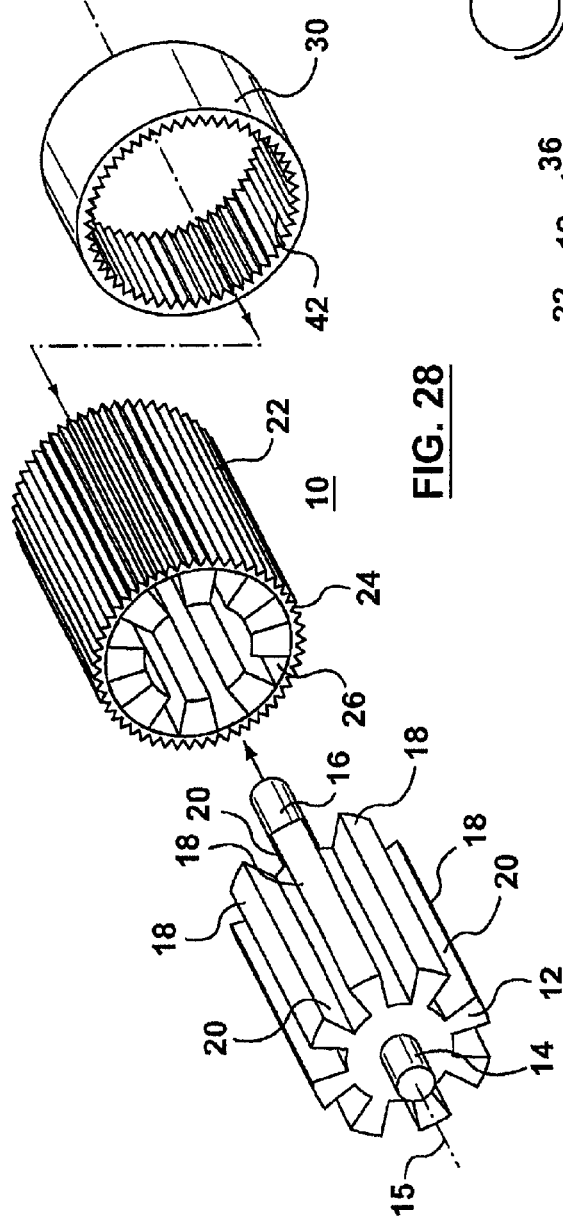
FIG. 28 is an exploded view of a splined flexispline motor.

FIG. 28 shows the essential component parts of flexispline motor 10. A core 12 is mounted in a frame (not shown) which prevents rotation of core 12. Core 12 may be composed of a stack of stamped laminations or it may be a composite, cast of magnetic material. The core 12 is provided with a shaft 15 having ends 14 and 16 at due opposite ends of core 12. Shaft end 14 is fixed so as to maintain core 12 stationary. Core 12 has a series of protruding ribs 18 formed in the surface thereof separated by valleys 20. The ribs 18 and the valleys 20 form a spline on which the sleeve type flexispline 22 is received in a spline engaging arrangement. The valleys 20 may also serve to house the windings necessary for the production of the electromagnetic field in the core.

Flexispline 22 which is of the form of a hollow cylinder has internal flexible ribs 24 (preferably of a polymeric based material) and valleys 26 which mate with valleys 20 and ribs 18 of the core 10.

The fit between the flexispline 22 and the core is somewhat loose to permit the required flexing of the flexispline in a radial direction, but prevents motion of the flexispline 22 in a circumferential direction. Thus providing a reaction to the output load torque, but with a lower distributed surface pressure. (This technique can also be used with one closed end cup type flexispline)

An internal band gear 30 is fitted into one end of flexispline 22 so as to be integral therewith. The band may be bonded to the sleeve type flexispline 22 or permanently fastened to the sleeve flexispline by some acceptable method.

It is important that the band gear 30 and the se eve type flexispline be capable of the required distortion in the presence of a rotating magnetic field established in core 12, in order to distort from a circular cross section to a multinodal shape in order to achieve proper operation of motor 10. Thus the use of construction materials having an elliptical low apparent elastic modulus for both the flexispline and the band gear is a necessity to achieve optimum operation of the motor 10. These techniques have been described previously in paragraphs [0055] to [0060].

Figure 29:
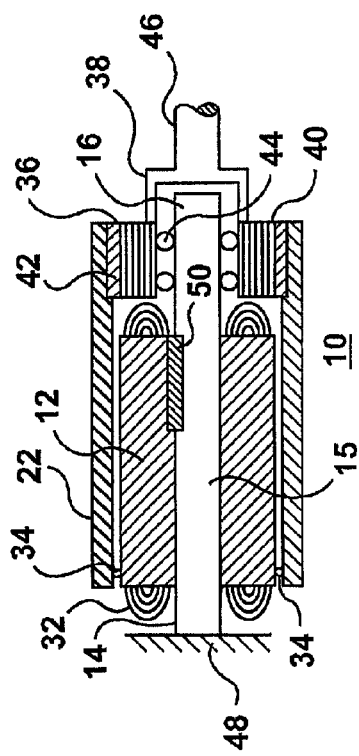
FIG. 29 is a cross sectional view of the assembled motor of FIG. 28.

FIG. 29 shows a cross section of the final assembly of motor 10. In this Fig., the shaft end 14 is permanently fixed to a reference to support motor 10. Shaft 14 is not permitted to turn. Coil windings 32 are shown on core 12 and are generally located in valleys (core slots) 20.

A fulcrum and retaining ring 34 is generally provided near the end of sleeve type flexispline 22 to establish and stabilize the rest position of the flexispline 22 on core 12.

A gear 36 is mounted on an assembly 38 for rotation on shaft 16 of motor 10. Gear 36 has external teeth 40 to engage with the band gear teeth 42. The teeth 42 of band gear 30 do not necessarily engage the teeth 40 of gear 36 under rest conditions.

The gear assembly 38 is mounted on bearings 44 for efficient rotation. Gear assembly 38 terminates in output shaft 46.

Core 12 is permanently fixed to the shaft 14-16 by means of key 50.

The motor functions as follows.

A rotating magnetic field is established in core 12 by windings 32. The magnetic attraction established by the magnetic field in core 12 attracts the magnetic sleeve type flexispline 22 so that opposite sides of the flexispline are drawn inwardly so that band gear 30 contacts the 40 of gear 36 at two diametrically opposed points.

As the magnetic field sweeps around the core 12 the distortion of the flexispline 22 and band gear 30 sweeps around gear 36 and core 12.

Because there are more teeth in the band gear 30 than the gear 36, the gear 36 rotates (according to the tooth differential) in a direction opposite to the rotating magnetic flux.

The ring 34 which may be fitted into sleeve 22 and core 12 by means of a circumferential groove and flange serves as a hinge, if desired for the flexure of the flexispline 22 on core 12 during operation.

The flexispline 22 may be made of a composite magnetic material, and or it may be a magnetic metallic cylinder over wound with a magnetic wire or magnetic tap contained therein to enhance its magnetic characteristics while not increasing substantially to the stiffness of the sleeve. This contruction has been described previously.

Figure 30:
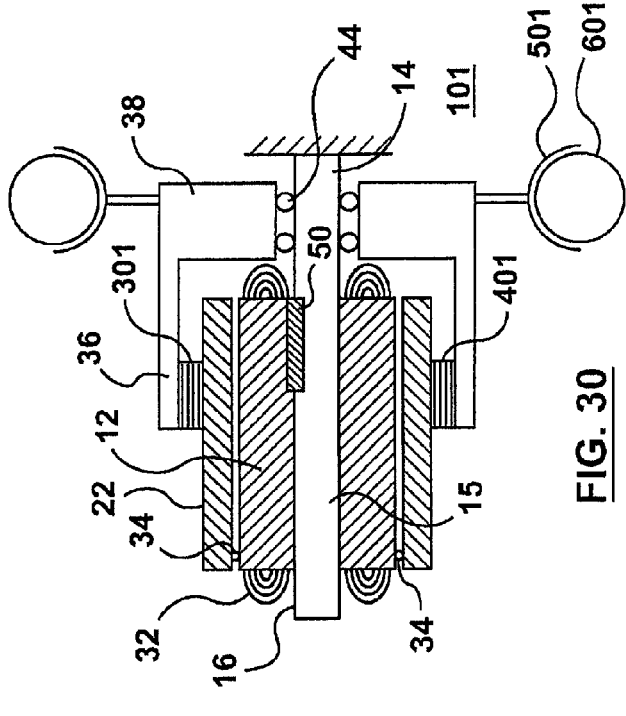
FIG. 30 shows an alternative flexispline motor arrangement, having in-board bearings.

Those skilled in the art will recognize that the motor 10 of FIG. 29 can be reconfigured as the arrangement 101 of FIG. 30 to place the angular thrust roller bearings 44 inboard of the magnetic core 12, and to reduce the magnitude of any off-centred load. In this case the band gear 301 is placed on the external surface of the flexispline 22, and the teeth 401 are placed on the internal surface of gear 36. Also shown in FIG. 30 is the potential placement of a rim 501, and tire 601, assembly for traction vehicle applications, and in-wheel arrangements in particular. Elements of this arrangement are also applicable to the motors 10 (FIG. 1), 110 (FIG. 2), 210 (FIG. 7), 210 (FIG. 8), 310 (FIG. 9), and 410 (FIG. 10). It is also intended that some of the features of motors 10 FIG. 29, and 101 FIG. 30 can be interchanged beneficially.

In summary, the flexispline motor of this invention preferably places the electro-magnetic core inside the flexispline, and minimises the flux flow path and flexispline stiffness. This concentrates the radial distortion force and maximizes the flexispline flux flow area. This construction has definite advantages over prior art devices in that the motor may produce greater torque and power and be much smaller and less complicated than previous devices.

The torque and power efficiency produced by a flexispline motor depends to a large extent on the square of the diameter of the flexispline. In prior art devices the flexispline is surrounded by an electro-magnetic core structure; and or motor casing, thus the diameter of the flexispline is much less than the external diameter of the motor structure. The applicant's structure, generally places the flexispline at the outer extremities of the motor thus increasing the torque versus motor size ratio significantly, and reducing flexispline stiffness thus increasing efficiency when compared to prior art motors.

The structure of the flexispline motor of this application is ideally suited for applications such as traction motor, robot joint, and snow blower auger drives, because of compactness, requisite high torque at low speed capability and the capacity to free wheel when the magnetic core is unexcited. Another application relates to hybrid automobile drives, and particularly, in retrofit situations, by placing in-wheel drives at the rear end of front wheel drive vehicles. Extension of the technology to large power dissipation devices is envisaged by means of forced cooling and the use of superconducting wire field windings, such as that produced by American Super Conductor Corporation.

In another embodiment of this invention the flexispline motor places an electromagnetic core both inside and outside of the flexispline, this allowing tricomal distortion of same. This has an advantage in some applications requiring smaller gear ratios and greater stiffness.

The Utilization of the composite flexispline embodying a magnetic filament or tape winding reduces the radial distortion stiffness whilst maximizing the return path magnetic flux flow area. This improves the power output by increasing the torque and improving the efficiency of the subject devices.

A comparison can be made between the commutation of the flexispline motor, and a switched-reluctance (SR) motor. It is recognised that the poles in the flexispline motor can be regarded as equivalent to the poles in an SR motor, and it is recognised that the commutation of a flexispline motor is similar enough to that of a SR motor, that the flexispline motor can take advantage of the modified existing well-developed SR commutation technologies. FIGS. 31A, 31B, 31C, 31D show how the typical text-book manner of commutating a SR motor may be applied to a flexispline motor. Whereas FIG. 32 depicts the commutation strategy. This is achieved generally by means of Hall effect magnetic sensing devices for rotor (flexispline) position and or parametic measurements of idle phase winding inductance as in FIG. 31D. Such technology is an integral and necessary element for efficient operation of the flexispline motor of this patent specification.

Figure 31A:
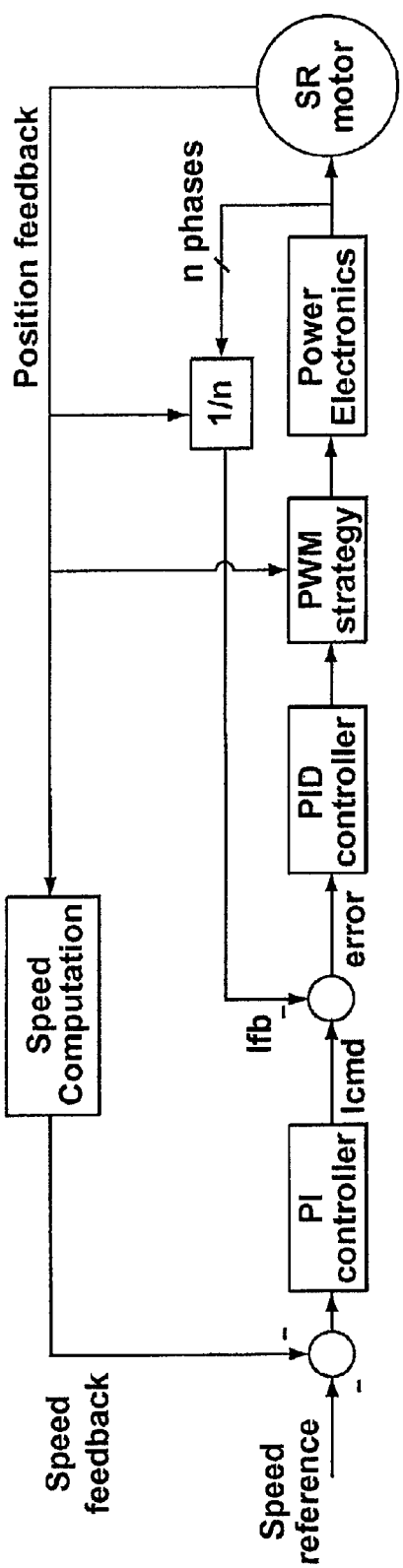
Figure 31B:
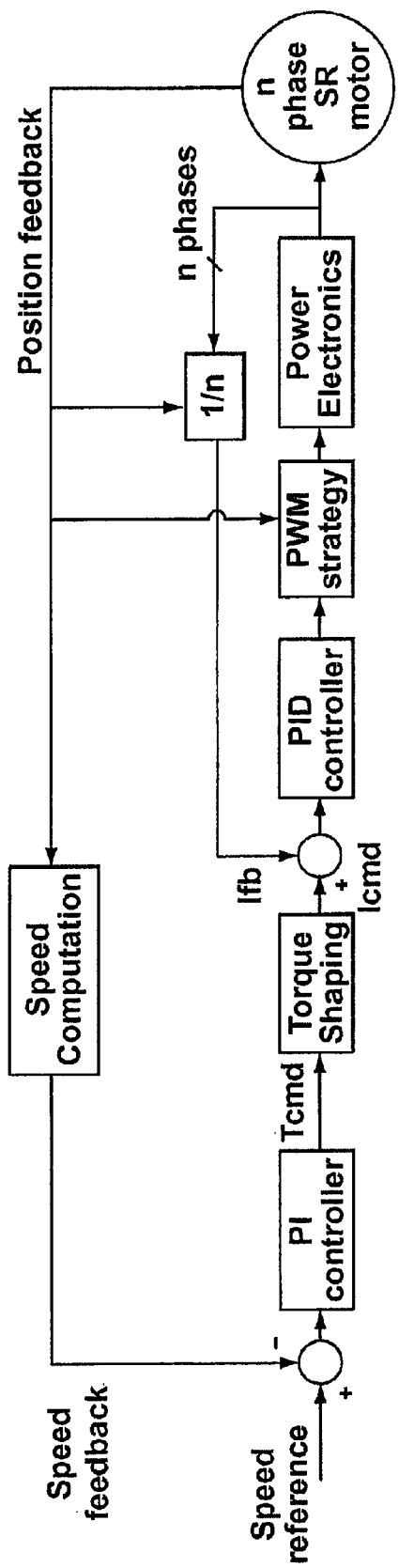
Figure 31C:
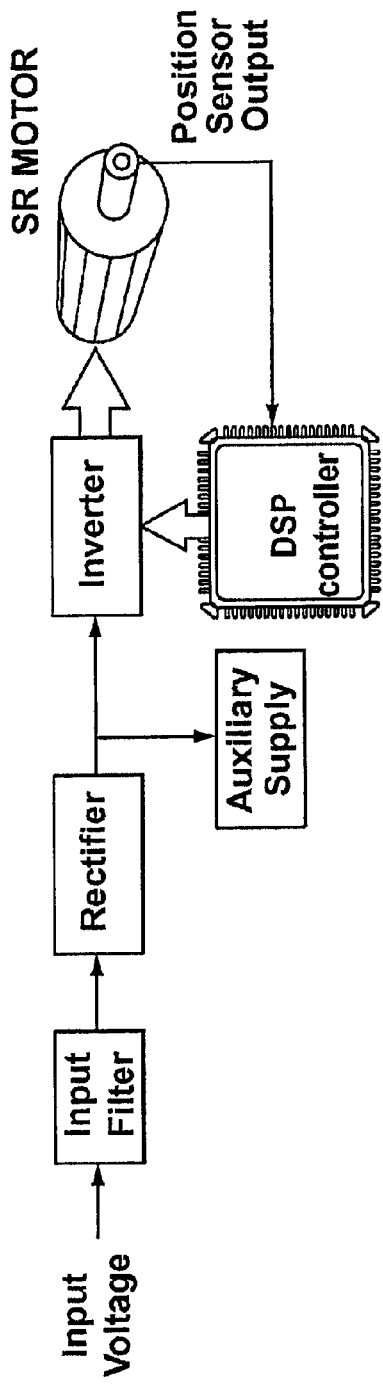
Figure 31D:
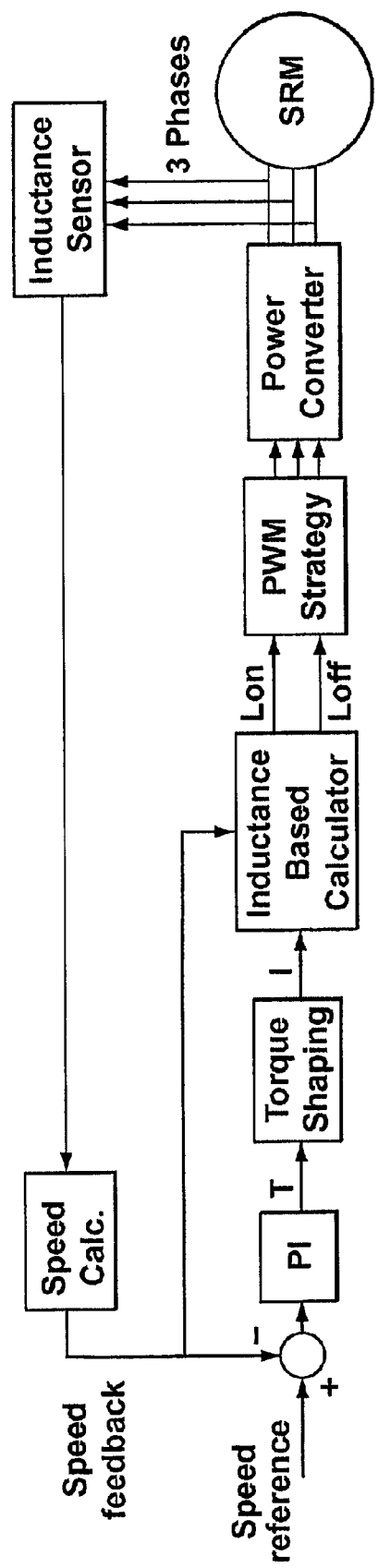

In FIGS. 31A, 31B, 31C, the abbreviations are:
PI=proportional integral
PID=proportional integral/derivative
Ifb=feed-back current
Icmd=command current
PWM=pulse width modulation
DSP=digital signal processor

The invention claimed is:

1. A flexispline motor comprising a stationary cylindrical electromagnetic core, a rotatively fixed flexispline, and a rotatable hub mounted with bearings on a support, said electromagnetic core being provided with a set of windings to produce a commutated and controlled rotating electromagnetic field so as to provide a radially directed rotating force, a flexispline comprising a disk portion and hollow cylindrical portion joined together to form an open cylindrical shape having at least one open end, said flexispline being mounted on said support in such a manner that said flexispline encircles and encompasses said electromagnetic core in a coaxial relationship with said electromagnetic core, said cylindrical shape portion of said flexispline comprising an elastically deformable magnetically permeable material and being in a closely spaced relationship with said core but not touching said core in an unexcited electromagnetic state, said flexispline having external gear teeth formed thereon in the form of an elastically deformable band encircling an exterior surface of the flexispline cylindrical shape adjacent the at least one open end of said flexispline, the said rotatable hub being mounted with bearings on said support adjacent to and coaxially with said flexispline, said hub having a complementary internal toothed ring gear overlying but closely spaced with said toothed external gear on said flexispline, wherein said open end of said flexispline and said toothed external gear of said flexispline being distorted in the presence of a rotating electromagnetic field in said electromagnetic core to form a multilobed shape such that said toothed external gear on said flexispline exhibits forcible radial toothed engagement with said internal toothed ring gear on said hub at the protruding lobes on the distorted flexispline multilobed shape formed by the said electromagnetic field causing the rotatable hub to rotate at a reduced rate and higher torque than the resolved rotating radially directed electromagnetic force.

2. A flexispline motor comprising a stationary cylindrical electromagnetic core, a rotatively fixed flexispline, a rotatable hub mounted with bearings on a support, said electromagnetic core being provided with a set of windings configured to produce a commutated and controlled rotating electromagnetic field so as to provide a radially directed rotating force, a flexispline comprising a disk flange portion and hollow cylindrical portion integrally joined together to form an open ended cylinder portion having at least one open end, the flexispline being mounted on said support in such a manner that said flexispline encircles and encompasses said electromagnetic core in a coaxial relationship with said core, said cylinder portion of said flexispline further comprising an elastically deformable magnetically permeable material and being in adjacent relationship with said core but not touching said core in an unexcited electromagnetic state, said flexispline having an elastically deformable toothed internal gear arrangement formed thereon on the interior surface of said cylinder in the form of a band, near the open end of said cylinder portion of the flexispline, the rotatable hub being mounted with bearings, on said support adjacent to and extending coaxially with said flexispline, said hub having complementary external gear teeth formed thereon, said hub complementary external gear being encircled by said elastically deformable toothed internal ring gear of said flexispline, said hub complementary external gear and said flexispline internal ring gear being adjacent to, touching or not touching in an unenergized electromagnetic state, wherein said flexispline is distorted upon the presence of a rotating electromagnetic field in said core to assume a multilobed shape such that said internal gear teeth on said flexipline exhibits radially directed forcible engagement with said external gear teeth on said hub at the protruding lobes of the multilobed flexispline shape so formed by the electromagnetic force causing the rotatable hub to rotate at a reduced rate and higher torque than the resolved rotating radially directed electromagnetic force.

3. A flexispline motor comprising a stationary cylindrical electromagnetic core, a rotatively fixed flexispline, and a rotatable hub mounted with bearings on a support, said electromagnetic core being provided with a set of windings to produce a commutated and controlled rotating electromagnetic field so as to provide a radially directed rotating force, a flexispline comprising a disk portion and hollow cylindrical portion integrally joined together to form an open cylindrical shape having at least one open end mounted on said support in such a manner that said flexispline encircles and encompasses said electromagnetic core and is in a coaxial relationship with said electromagnetic core, said cylindrical shape portion of said flexispline comprising an elastically deformable magnetically permeable material and being in a closely spaced relationship with said core but not touching said core in an unexcited electromagnetic state, said flexispline having external gear teeth formed thereon in the form of an elastically deformable band encircling an exterior surface of the cylindrical shape adjacent the at least one open end of said flexispline, the rotatable hub being mounted with bearings on said support adjacent to and extending coaxially with said flexispline, said hub having complementary internal toothed ring gear overlying but closely spaced with said toothed external gear on said flexispline, wherein said open end of said flexispline comprising said external gear being distorted radially in the presence of a rotating electromagnetic field in said electromagnetic core to form a multilobed shape such that said toothed external gear on said flexispline exhibits radial toothed forcible engagement with said internal toothed ring gear on said hub at the protruding lobes on the distorted flexispline shape formed by the electromagnetic field causing the rotatable hub to rotate at a reduced rate and higher torque than the resolved rotating radially directed electromagnetic force and wherein said cylinder portion of the flexispline is overwound with a magnetically permeable tape or magnetically permeable wire material and/or shrunk fitted magnetically permeable collars so as to provide locked in compressive radial stress or pressure in the said flexispline.

4. A flexispline motor comprising a stationary cylindrical electromagnetic core, a rotatively fixed flexispline, and a rotatable hub mounted with bearings on a support, said electromagnetic core being provided with a set of windings configured to produce a commutated and controlled rotating electromagnetic field so as to provide a radially directed rotating force, a flexispline comprising a disk flange portion and hollow cylindrical portion integrally joined together to form an open ended cylinder shape having at least one open end, and mounted on said support in such a manner that said flexispline encircles and encompasses said electromagnetic core and is in a coaxial relationship with said core, said cylinder portion of said flexispline further comprising an elastically deformable magnetically permeable material and being in adjacent relationship with said core but not touching said core in an unexcited electromagnetic state, said flexispline having an elastically deformable toothed internal gear arrangement formed thereon on the interior surface of said cylinder in the form of a band, near the open end of said cylinder portion of the flexispline, the rotatable hub mounted with bearings on said support adjacent to and extending coaxially with said flexispline, said hub having complementary external gear teeth formed thereon, said complementary external gear teeth being encircled by said elastically deformable toothed internal ring gear of said flexispline, said hub complementary external gear teeth and said flexispline internal ring gear being adjacent to, but touching or not touching in an unenergized electromagnetic state, wherein said flexispline and its ring gear are distorted upon the presence of a rotating electromagnetic field in said core to assume a multilobed shape and wherein both the hub external gear teeth and said flexispline internal ring gear forcibly contact at protruding lobes of the multilobed shape so formed causing the rotatable hub to rotate at a reduced rate and higher torque than the resolved rotating radially directed electromagnetic force and wherein said flexispline is overwound with magnetically permeable tape or magnetically permeable wire material and or shrunk fitted magnetically permeable collars so as to provide locked in compressive radial stress or pressure in the said flexispline.

5. A flexispline motor comprising a base, a disk-shape rotatable hub, a hollow post affixed to said base, a stationary cylindrical electromagnetic core and a rotatively fixed flexispline mounted on said base and said hollow post so as to effect a coaxial working relationship with said hollow post, said electromagnetic core being provided with a set of windings to produce a controlled and commutated rotating electromagnetic field so as to provide a radially directed rotating force, the flexispline comprising a disk flange portion and hollow cylindrical portion integrally joined together to form the general shape of an open ended cylindrical element with at least one open end, and mounted on said support so that the hollow cylindrical flexispline element encircles and encompasses said electromagnetic core and is in a coaxial relationship with said electromagnetic core, said cylindrically shaped portion of said flexispline comprising an elastically deformable magnetically permeable material and being in an adjacent relationship with said electromagnetic core but not touching said electromagnetic core in an unexcited electromagnetic state, said flexispline having an externally toothed gear formed thereon in the form of an elastically deformable band encircling an exterior surface of said flexispline cylinder near an open end of said flexispline, a shaft mounted within said hollow post on bearings for rotation within said hollow post and passing through said base, said shaft being accessible at both ends of the shaft by way of shaft extensions, said shaft being connected to the disk shaped rotatable hub at an end opposite said base, a ring gear carried by said hub in a working relationship with said flexispline, said internally toothed hub ring gear and the flexispline externally toothed gear having gear teeth that will mesh radially, but differ in number, wherein said open end of said flexispline and said flexispline gear being distorted in the presence of a rotating electromagnetic field in said core to form a general multilobed shape such that the flexispline gear teeth exhibit forcible toothed radial engagement with said hub ring gear at protruding lobes on the flexispline multilobed shape so formed by the electromagnetic field causing the rotatable hub to rotate at a reduced rate and higher torque than the resolved rotating radially directed electromagnetic force.

6. A flexispline motor comprising a base, a stationary cylindrical electromagnetic core, a hollow post, a rotatively fixed flexispline and a rotatable hub mounted with bearings on a shaft at a point intermediate between the ends of the shaft, said shaft passing within said hollow post and electromagnetic core and the shaft being supported on bearings, said shaft being accessible at both ends of said flexispline motor, said core being provided with a set of windings to produce a rotating electromagnetic field so as to provide a radially directed rotating force, the flexispline comprising a disk flange portion and hollow cylindrical portion integrally joined together to form an open cylinder element having at least one open end and mounted on a support to encircle and encompass said electromagnetic core and is in a coaxial relationship with said electromagnetic core, said hollow cylindrical portion of said flexispline comprising an elastically deformable magnetically permeable material in adjacent relationship with and encompassing said electromagnetic core but not touching said electromagnetic core in an unexcited electromagnetic state, said flexispline having an elastically deformable internal toothed gear formed thereon on an interior surface of said flexispline cylinder as a band, near the open end of said flexispline, a rotatable hub carrying an external ring gear mounted within said flexispline and extending coaxially with said flexispline said hub ring gear being encircled by said elastically deformable internal toothed ring gear of said flexispline, said hub ring gear and said internal toothed flexispline ring gear having teeth which will mesh radially but differ in number and are adjacent, but are touching or not touching in an unenergized electromagnetic state, wherein said flexispline internal toothed gear is distorted upon the presence of a rotating electromagnetic field in said electromagnetic core to assume an multilobed shape and forcibly contact said hub ring gear at protruding lobes of the multilobed shape so formed by the electromagnetic field causing the said hub to rotate at a reduced rate and higher torque than the resolved rotating radially directed electromagnetic force.

7. A flexispline motor as claimed in claim 5 wherein said flexispline is overwound with a magnetically permeable tape or magnetically permeable wire material and or shrunk fitted magnetically permeable collars so as to provide locked in compressive radial pressure or stress in the flexispline.

8. A flexispline motor as claimed in claim 6 wherein said flexispline is overwound with a magnetically permeable tape or magnetically permeable wire material and or shrunk fitted magnetically permeable collars so as to provide locked in compressive radial pressure or stress in the flexispline.

9. An electromagnetic core for a flexispline motor comprising a magnetically permeable core of a hub and spoke shaped construction, said core comprising
   a) Stacked laminations or composites to form a unitary structure having a number of radially spaced rectangular cross section poles surrounding said hub and wherein the said core pole faces are skewed longitudinally or tapered longitudinally or both tapered and skewed longitudinally so as to effect a parallel longitudinal air gap between the said core pole faces and the inwardly maximum distorted portions of the flexispline;
   b) A winding fitted to each pole or group of poles so as to produce a rotating electromagnetic field in each pole, and wherein the windings on each group of complementary poles on said electromagnetic core are energized and configured electronically to produce radially directed rotating forces which consequently produce rotating multilobal flexispline distortions of at least two lobe shapes.

10. An electromagnetic core as claimed in claim 9 wherein the coils of each group of complementary poles on said electromagnetic core are connected in a series or parallel relationship.

11. An electromagnetic core in a structure for the production of a continuous wave deflection in a magnetically permeable flexispline member in a flexispline motor comprising, a series of stacked magnetically permeable laminations or equivalent composites, stacked to form a unitary core having a hub and spoke configuration, such that a number of rectangular cross section core legs extend radially from said core hub at evenly spaced intervals, and wherein the said core leg outer pole faces are skewed longitudinally or tapered longitudinally, or both skewed and tapered longitudinally, so as to effect a parallel longitudinal air gap between the core leg outer pole faces and inwardly maximum distorted portions of the flexispline, each leg containing electromagnetic coil windings, each electromagnetic coil being sequentially energized from a source of electrical energy to produce a rotating radially directed electromagnetic force in said electromagnetic core, and wherein said forces produced in each opposing complementary group of core legs is in a bucking relationship.

12. An electromagnetic core as claimed in claim 11 wherein eight core legs are present, and the source of electrical energy is a four phase source supplying unipolar direct current pulses having frequency and, amplitude control, and electronic commutation of output current wave forms, and wherein the electromagnetic coils on each pair of opposing pairs of complementary core legs are connected to said source of electrical energy in a series or parallel bucking relationship.

13. An electromagnetic core in a flexispline motor, said core comprising a cylindrical configuration and having a series of radially extending rectangular cross section teeth protruding from said core, said core having teeth of variable widths arranged in a regular sequence around the circumference of said core separated by slots of uniform width and wherein said widths optimize flux saturation levels in the magnetic iron circuit of said teeth.

14. An electromagnetic core in a flexispline motor comprising magnetically permeable laminations, or equivalent composites forming a cylindrical core, said electromagnetic core having a series of projecting rectangular cross section teeth having two distinct widths separated by slots of equal width, and wherein teeth of lesser width are double the number of the teeth of wider width.

15. A winding system for the electromagnetic core of claim 14 wherein each core tooth of wider width is provided with a first coil and a secondary coil is made to encircle said first coil plus the teeth of lesser width on either side of said core tooth of wider width arranged and excited so as to maximize a radially directed electromagnetic force vector.

16. A flexispline motor comprising a stationary electromagnetic core, a rotationally fixed flexispline sleeve, and a harmonic gear device wherein: said electromagnetic core is mounted on a stationary member and has a cylindrical shape having wide splined grooves on the exterior surface, wherein said grooves also serve to accommodate electromagnetic core field coil windings incorporated therein, said windings arranged so as to produce a rotating radially directed electromagnetic force in said electromagnetic core, a magnetically permeable sleeve mounted coaxially on said electromagnetic core, said sleeve having the shape of a hollow cylinder having an interior cylindrical surface embodying deformable matching male splines formed in said interior surface to mate with said grooved exterior surface of said electromagnetic core in a sliding relationship which permits flexing of the male splined exterior surface in a radial direction and transfer of torque but which does not permit said sleeve to move in a circumferential rotational direction, said sleeve having an overlapping end extending beyond said electromagnetic core, said overlapping end of said sleeve having an internal flexible gear formed therein having a predetermined tooth form of constant pitch, a driven gear being mounted within said overlapping end of said sleeve in a coaxial relationship with said electromagnetic core and said sleeve, wherein said driven gear having external teeth which mesh with said flexible gear internal teeth and being mounted with bearings so as to permit rotation about a central axis of said sleeve and electromagnetic core, said driven external gear and said internal gear sleeve being in a contacting or non-contacting relationship in the absence of an electromagnetic field in said electromagnetic core, wherein said sleeve undergoes a cyclical radial elastic deformation in the presence of a rotating electromagnetic field in said electromagnetic core so as to form a rotating multilobed shape such that the internal gear teeth formed in said sleeve, move radially to forcibly contact and mesh with said driven hub gear teeth in the presence of a rotating electromagnetic force in said electromagnetic core, such that protruding lobes of the multilobed shape so formed in said sleeve and its internal gear teeth forcibly contact said driven gear, to cause said driven gear to rotate at a lower rate and at higher torque than the resolved rotating radially directed electromagnetic force.

17. A flexispline motor comprising a stationary electromagnetic core assembly, and a rotor hub gear, a rotatively fixed magnetically permeable flexispline, said hub gear having complementary gear teeth on a predetermined surface arranged to mesh radially with corresponding gear teeth on the flexispline, said flexispline having an open ended cylindrical shape having at least one open end with a predetermined radius r, said flexispline having a set of gear teeth incorporated in a predetermined surface of said flexispline near the at least one open end of said flexispline, said flexispline teeth being arranged to mesh radially with the coaxial rotor gear teeth, said rotatively fixed flexispline being mounted coaxially within and between a stationary annulus of substantially cylindrically extending electromagnetic core assemblies comprising at least one of:

a) an inner electromagnetic core assembly having a series of salient poles whose number is a multiple of two or three protruding therefrom so that the pole tips of said inner core assembly lie in the locus of a circle having a radius r1, and b) an outer electromagnetic core assembly having a series of inwardly extending poles equal in number to the poles on said inner core assembly, such that each pole on said outer core assembly is spaced directly opposite from a pole on said inner core assembly, the pole tips of said outer core assembly lie in the locus of a circle having radius r2 such that r2 is greater than r is greater than r1, and winding elements on said cores to establish two rotating fields in space differing in phase relationship by 90 degrees or 60 degrees, respectively;

c) said poles being electronically configured, commutated and electrically energized so that three equally spaced poles on an outer core of said stator are energized simultaneously and synchronized with three previously selected poles on said inner core, wherein said inner core poles are spaced midway between energized poles on said outer core, said flexispline being therefore deformed from a circular shape into a rotating tricornal shape in the presence of said electromagnetically energized poles;

d) alternatively said poles being electronically configured, commutated and electrically energized in synchronism so that two opposite and equally spaced poles on outer core of said stator are energized simultaneously with two previously selected poles on said inner core wherein said inner core poles are spaced midway between energized poles on said outer core, said flexispline being deformed from a circular shape into a rotating elliptical shape in the presence of said electromagnetically energized pole; and e) arrangements c) and d) are combined in one flexispline motor generator system so as to effect an electronically controlled and selected dual ratio gear reduction system.

18. A prime-mover apparatus, for converting by means of varying magnetic reluctance supplied electrical energy into rotary mechanical motion of a rotor with respect to a stator, about a drive-axis, and/or converting by means of varying magnetic reluctance supplied mechanical torque motion into produced electrical energy by using a stator, a rotatable hub and an electronic commutator, wherein the stator, rotatable hub and commutator comprise:

a) an elastically deformable magnetically permeable rotatively fixed cylindrical flexispline overwound with magnetically permeable wire or tape and/or fitted with magnetically permeable shrunk fitted collars to produce a locked in radial compressive stress or pressure in the said flexispline;

b) a flexispline annulus having gear teeth, which form a stator-drive-gear; the annulus being sufficiently elastic as to be deformable radially, being electromagnetically deformable in the sense that the flexispline annulus takes on a lobed configuration, upon appropriate radially-directed electromagnetic forces being applied to the annulus;

c) the flexispline annulus having a number X of gear teeth, which form a stator drive-gear;

d) a rotatable hub mounted on bearings which forms the rotor-drive-gear which is a solid structure, not electromagnetically deformable into a lobed configuration;

e) the rotor-drive-gear is concentric with the stator-drive-gear, f) the number Y of teeth on the stator-drive-gear is different from the number X of teeth on the rotor-drive-gear;

g) the stator-drive-gear and the rotor-drive-gear are so configured that, when the flexispline of the stator has electromagnetically deformed into the lobed configuration, portions of the stator-drive-gear teeth corresponding to the induced lobes of the flexispline move radially into meshing engagement with teeth of the rotor-drive-gear;

h) the stator includes N electrical coils wound around stator core teeth of rectangular cross section in axial planform and located at respective coil-orientations, around the drive-axis; in a manner such as to minimise the length of the magnetic flux flow path the coils are so structured, commutated, and arranged that, when energised with electricity, the coils create poles which exert respective radially-directed magnetic forces in a programmed sequential manner;

i) the arrangement of the apparatus is such that the said radially-directed magnetic forces act upon the electromagnetically deformed flexispline, and induce the flexispline to deform into the multilobed configuration;

the rotatable hub comprises:

(a) a solid structure, electromagnetically non-deformable into a lobed configuration, (b) the rotatable hub provided with a number "Y" of gear-like teeth which in total form a hub drive gear and wherein the number of teeth "X" on the stator drive gear is different from the number "Y" on the hub-drive-gear.

(c) a hub drive gear mounted with bearings concentrically with the stator drive gear, around the drive axis and adjacent to the stator electromagnetic core;

the apparatus including an electronic commutator receiving the supplied electrical energy, and switching supplied electrical energy to the coils, thereby cyclically energising and de-energising the coils sequentially in a rotational pattern around the drive axis, with the unused energy minus losses being returned to the energy source, the apparatus including a cyclic-operator, operating the commutator to energize and de-energize the coils sequentially in a rotational pattern, around the drive-axis;

the arrangement of the apparatus is such that operating the commutator in the rotational pattern drives the lobed configuration of the elastic stator flexispline to rotate around the drive-axis, its speed of rotation being a lobe-rotate-speed Z rpm; and whereby magnified torque output from the rotor-drive-gear is driven to rotate at a speed of $Z*(Y-X)/Y$ rpm.

19. A flexispline motor comprising:

a stationary cylindrical electromagnetic core provided with a set of windings to produce a commutated and controlled rotating radially directed electromagnetic force, a rotatable hub mounted with bearings on a support, a rotatively fixed cylindrical flexispline comprising a disk portion and cylindrical portion mounted on the support to encircle and encompass the electromagnetic core and be in coaxial relationship with the said core, the flexispline comprising an elastically deformable magnetically permeable material and being adjacent to the core but not touching said core in an unexcited electromagnetic state, the flexispline having external gear teeth or internal gear teeth formed thereon in an elastically deformable band encircling an exterior surface or internal surface, respectively, of the flexispline adjacent an open end of the flexispline, the rotatable hub being mounted with bearings on the support adjacent to and coaxially with the flexispline, the said hub having complementary ring gear teeth overlying or underlying, respectively, said toothed external gear or internal gear on the flexispline, wherein the open end of said flexispline and its toothed external gear or internal gear are distorted in the presence of a rotating radially directed electromagnetic field in the electromagnetic core to form a multilobed shape such that the external toothed gear or internal toothed gear on said flexispline provide forcible toothed engagement with the hub ring gear causing hub ring gear to rotate at a lower rate and increased torque with respect to the resolved rotating radially directed electromagnetic field.

20. An apparatus for converting by means of varying magnetic reluctance, supplied electrical energy into rotary mechanical high torque motion of a rotatable hub, with respect to a stator, about a drive axis, and/or converting by means of varying magnetic reluctance, mechanical motion into produced electrical energy, by using a stator, the rotatable hub, and electronic commutation, wherein the stator, hub, and electronic commutation are described as follows:

(I) the stator is comprised of (a) and (b):
  (a) An elastically deformable, magnetically permeable, annular, rotatively fixed cylindrical flexispline which may be overwound with electrical open circuit, magnetically permeable wire or tape and/or may have magnetically permeable shrunk-fitted collar(s), wherein the layers or collar segment(s) of said magnetic elements are so constructed and insulated to lock in radial compressive stress or pressure in said flexispline, such that its resistance to radial deformation by the appropriate electromagnetic forces is significantly reduced and wherein the layers or segment(s) of said magnetically permeable: wire, tape and collar(s) are electrically open circuit and so constructed and insulated that the effect of eddy currents is minimized;
  the flexispline annulus having a number "X" of gear-like teeth, which in total form a stator-drive-gear; the annulus being sufficiently elastic as to be deformable radially, being deformable in the sense that the annulus takes on a multilobed configuration when appropriate radially directed electromagnetic forces are applied to said annulus and wherein the number of said lobes may be configured electronically, and
  (b) an electromagnetic permeable stator core, with windings thereon, comprised of "N" electrical coils wound around stator core teeth of rectangular cross section, and located at respective radial coil-orientations around the drive axis, with the stator core placed internal to and within the said flexispline annulus in a manner such as to minimize the length of the magnetic flux flow path, the coils being so structured, commutated, and arranged that, when energized with electricity, the coils create electromagnetic poles which exert respective radially-directed electromagnetic forces which rotate around the drive axis in a programed sequential manner, such that the radially-directed electromagnetic forces act upon the flexispline annulus and induce said flexispline to deform into the multilobed configuration; and
(II) the rotatable hub comprising:
  (d) a solid structure, non-deformable into a lobed configuration;
  (e) the hub provided with a number "Y" of gear-like teeth which in total form a hub drive gear and wherein the number of teeth "X" on the stator drive gear is different form the number "Y" on the hub-drive-gear; and
  (f) a hub drive gear mounted with bearings concentrically with the stator drive gear, around the drive axis and adjacent to the stator electromagnetic core; and
(III) the stator-drive-gear and the hub-drive-gear are so configured that, when the flexispline annulus of the stator has electromagnetically deformed into the lobed configuration, portions of the stator drive-gear teeth corresponding to the protruding lobes of the flexispline annulus, move radially into meshing engagement with teeth of the hub-drive-gear thus varying the stator magnetic reluctance; and
(IV) the apparatus includes an electronic commutator which receives supplied electrical energy and switches said energy to the stator coil windings, thereby cyclically energizing and de-energizing the coils sequentially in a controlled and programmed rotational pattern around the drive axis, with the unused or generated energy, minus losses, being returned to the energy source; and
  the apparatus also includes a cyclic-operator, which operates the said electronic commutator to energize and de-energize the said coils sequentially in a rotational pattern around the drive axis wherein arrangement of the apparatus is such that operating the said cyclic-operator and said commutator drives the deformed multilobed configuration of the flexispline annulus to rotate around the drive-axis at lobe-rotate-speed "Z" rpm and whereby output from the rotor-drive-gear is driven to rotate at a speed "R" whereby "R" is determined by: $R=Z*(X-Y)/X$ producing a higher torque output and reduced output rotational rate compared with stator field rotation excitation.

21. The apparatus of claim 20 wherein the stator coil windings are wound using super conducting wire material.

22. A method of using the motor generator of claim 20 comprising a method of exciting and commutating stator phase windings which have first and second ends comprises:
  1) supplying a unidirectional pulsed direct current source of electrical power, having a positive and negative bus, to each phase windings and,
  2) connecting a first switch S1 between said positive bus and said first end of said windings and,
  3) connecting a second end of said windings to said negative bus of said power source and,
  4) connecting a second switch S2 between said negative bus and said second end of said windings and,
  5) connecting a first reverse poled diode D2 between said first end of said windings and said negative bus and,
  6) connecting a second reverse poled diode D1 between said second end of said windings and said positive bus;
and whereby the process of sequential commutation in each phase is achieved in three stages namely:
  a) Stage-1 voltage is supplied to phase coil windings, charging same and allowing current to rise to a predetermined level wherein switches S1 and S2 are closed and conducting, whereas diodes D1 and D2 are non conducting:
  b) Stage-2 current is maintained at a predetermined level by switching voltage on and off by means of pulse width modulation by switching S2 on, and switching S1 on and off repeatedly, or by switching S1 and S2 on and off repeatedly, or alternatively by current regulation.
  c) Stage-3 current supply from source to phase field coils is switched off and said coils are discharging current and stored energy, with said discharge current flowing back to energy source and wherein switches S1 and S2 are open and non-conducting and whereas diodes D1 and D2 are conducting, the magnetic core iron is defluxing, and the discharge current tail is curtailed.

23. The apparatus of claim 20 wherein a diameter of the cylindrical electromagnetic core and teeth are tapered and or skewed longitudinally so as to effect a parallel air gap between said core's outer diameter and a distorted flexispline minimum diameter when the flexispline is deformed.

24. A flexispline motor according to claim 18 wherein the stator coil windings are wound with super conducting wire material.

25. A method according to claim 20 for converting the generally balanced and unused, high radial force which exists between the electromagnetic pole tips and back iron or soft iron target of electric machines of the motor generator category into rotary torque by means of the inclined plane or wedge effect principle of radially meshing gear-like teeth in a harmonic drive flexispline arrangement.

26. A motor generator comprising the flexispline motor of claim 5 connected to a plurality of said motor generators wherein the said electrical motor generators are coupled shaft to shaft so as to comprise a common shaft to form a distributed system of torque and electrical energy production wherein on demand some of said machines produce torque and some produce electrical energy, or alternately all produce torque or all produce electrical energy.

27. A motor generator comprising the flexispline motor of claim 6 connected to a plurality of said motor generators wherein the said electrical motor generators are coupled shaft to shaft so as to comprise a common shaft to form a distributed system of torque and electrical energy production wherein on demand some of said machines produce torque and some produce electrical energy, or alternately all produce torque or all produce electrical energy.

28. The motor generator of claim 26 wherein the stator coil windings of all said motor generators are wound with super conducting wire material.

29. The motor generator of claim 27 wherein the stator coil windings of all said motor generators are wound with super conducting wire material.

* * * * *